(12) United States Patent
Vasapoli et al.

(10) Patent No.: US 7,569,169 B2
(45) Date of Patent: Aug. 4, 2009

(54) INJECTION MOLDING FLOW CONTROL APPARATUS AND METHOD

(75) Inventors: Michael Vasapoli, Gloucester, MA (US); Sergio Antunes, Scottsdale, AZ (US); Mark Moss, Boxford, MA (US); Christopher W. Lee, Beverly, MA (US); Mark Doyle, Newburyport, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 0 days.

(21) Appl. No.: 12/181,433

(22) Filed: Jul. 29, 2008

(65) Prior Publication Data

US 2008/0315445 A1    Dec. 25, 2008

Related U.S. Application Data

(63) Continuation of application No. 11/757,577, filed on Jun. 4, 2007, now Pat. No. 7,419,625, which is a continuation of application No. 10/455,881, filed on Jun. 6, 2003, now Pat. No. 7,234,929, which is a continuation-in-part of application No. 10/269,927, filed on Oct. 11, 2002, now abandoned, which is a continuation of application No. 09/400,533, filed on Sep. 21, 1999, now Pat. No. 6,464,909, which is a continuation-in-part of application No. 09/063,762, filed on Apr. 21, 1998, now Pat. No. 6,361,300.

(60) Provisional application No. 60/431,923, filed on Dec. 9, 2002, provisional application No. 60/124,596, filed on Mar. 16, 1999.

(51) Int. Cl.
B29C 45/77    (2006.01)

(52) U.S. Cl. ............... 264/40.1; 264/328.8; 425/145; 425/564

(58) Field of Classification Search ............... 264/40.1, 264/40.5, 328.8; 425/145, 146, 149, 564, 425/570, 572
See application file for complete search history.

(56) References Cited

U.S. PATENT DOCUMENTS 3,535,742 A    10/1970   Marcus .................... 18/30
(Continued)

FOREIGN PATENT DOCUMENTS

CA    1204906    5/1986
(Continued)

OTHER PUBLICATIONS

Kazmer, David O., et al., "Multi-Cavity Pressure Control in the Filling and Packing Stages of the Injection Molding Process," *Polymer Engineering and Science* (Nov. 1997) vol. 37, No. 11: 1865-1879.

(Continued)

Primary Examiner—Jill L Heitbrink
(74) Attorney, Agent, or Firm—Rissman Hendricks & Oliverio LLP

(57) ABSTRACT

In an injection molding machine having upstream and downstream channels communicating with each other for delivering fluid material to one or more mold cavities, apparatus for controlling delivery of the melt material from the channels to the one or more mold cavities, each channel having an axis, the downstream channel having an axis intersecting a gate of a cavity of a mold, the upstream channel having an axis not intersecting the gate and being associated with an upstream actuator interconnected to an upstream melt flow controller disposed at a selected location within the upstream channel, the apparatus comprising a sensor for sensing a selected condition of the melt material at a position downstream of the upstream melt flow controller; an actuator controller interconnected to the upstream actuator, the actuator controller comprising a computer interconnected to a sensor for receiving a signal representative of the selected condition sensed by the sensor, the computer including an algorithm utilizing a value indicative of the signal received from the sensor as a variable for controlling operation of the upstream actuator; wherein the upstream melt flow controller is adapted to control the rate of flow of the fluid material at the selected location within the upstream channel according to the algorithm.

4 Claims, 21 Drawing Sheets

U.S. PATENT DOCUMENTS

| | | | |
|---|---|---|---|
| 3,780,764 A | 12/1973 | Geist | 137/613 |
| 3,820,928 A | 6/1974 | Lemelson | 425/146 |
| 3,861,841 A | 1/1975 | Hanning | 425/146 |
| 3,952,927 A | 4/1976 | Schaumburg et al. | 222/510 |
| 4,389,002 A | 6/1983 | Devellian et al. | 222/146 |
| 4,424,015 A | 1/1984 | Black et al. | 425/138 |
| 4,500,279 A | 2/1985 | Devellian et al. | 425/548 |
| 4,521,179 A | 6/1985 | Gellert | 425/548 |
| 4,588,367 A | 5/1986 | Schad | 425/549 |
| 4,592,711 A | 6/1986 | Capy | 425/144 |
| 4,701,292 A | 10/1987 | Valyi | 264/155 |
| 4,717,324 A | 1/1988 | Schad et al. | 425/564 |
| 4,720,253 A | 1/1988 | Koentges | 425/145 |
| 4,863,369 A | 9/1989 | Schad et al. | 425/547 |
| 4,931,234 A | 6/1990 | Schad et al. | 264/40.1 |
| 4,932,854 A | 6/1990 | Matsuda et al. | 425/144 |
| 5,078,589 A | 1/1992 | Osuna-Diaz | 425/562 |
| 5,141,696 A | 8/1992 | Osuna-Diaz | 264/297.2 |
| 5,149,547 A | 9/1992 | Gill | 425/145 |
| 5,192,555 A | 3/1993 | Arnott | 425/544 |
| 5,223,275 A | 6/1993 | Gellert | 264/328.8 |
| 5,249,947 A | 10/1993 | Inaba et al. | 425/150 |
| 5,281,374 A | 1/1994 | Matsuda et al. | 264/39 |
| 5,288,222 A | 2/1994 | Wieser | 425/190 |
| 5,356,576 A | 10/1994 | Fischbach | 264/40.4 |
| 5,389,315 A | 2/1995 | Yabushita | 264/40.1 |
| 5,492,467 A | 2/1996 | Hume et al. | 425/549 |
| 5,545,028 A | 8/1996 | Hume et al. | 425/549 |
| 5,554,395 A | 9/1996 | Hume et al. | 425/549 |
| 5,556,582 A | 9/1996 | Kazmer | 264/40.1 |
| 5,601,773 A | 2/1997 | Schmidt et al. | 264/328.8 |
| 5,674,439 A | 10/1997 | Hume et al. | 264/40.6 |
| 5,871,786 A | 2/1999 | Hume et al. | 425/549 |
| 5,885,624 A | 3/1999 | Katsuta et al. | 425/149 |
| 5,885,628 A | 3/1999 | Swenson et al. | 425/549 |
| 5,894,025 A | 4/1999 | Lee et al. | 425/562 |
| 5,916,605 A | 6/1999 | Swenson et al. | 426/564 |
| 5,948,448 A | 9/1999 | Schmidt | 425/192 R |
| 5,948,450 A | 9/1999 | Swenson et al. | 425/562 |
| 5,980,237 A | 11/1999 | Swenson et al. | 425/549 |
| 6,000,831 A | 12/1999 | Triplett | 364/475.09 |
| 6,027,328 A | 2/2000 | Herbst | 425/553 |
| 6,062,840 A | 5/2000 | Lee et al. | 425/130 |
| 6,099,767 A | 8/2000 | Tarr et al. | 264/40.1 |
| 6,145,022 A | 11/2000 | Takizawa et al. | 710/10 |
| 6,206,674 B1 | 3/2001 | Foltuz et al. | 425/185 |
| 6,254,377 B1 | 7/2001 | Kazmer et al. | 425/562 |
| 6,261,075 B1 | 7/2001 | Lee et al. | 425/130 |
| 6,261,084 B1 | 7/2001 | Schmidt | 425/564 |
| 6,276,914 B1 | 8/2001 | Sicilia | 425/564 |
| 6,287,107 B1 | 9/2001 | Kazmer et al. | 425/562 |
| 6,294,122 B1 | 9/2001 | Moss et al. | 264/328.9 |
| 6,309,208 B1 | 10/2001 | Kazmer et al. | 425/562 |
| 6,343,921 B1 | 2/2002 | Kazmer et al. | 425/145 |
| 6,343,922 B1 | 2/2002 | Kazmer et al. | 425/145 |
| 6,361,300 B1* | 3/2002 | Kazmer et al. | 425/145 |
| 6,419,870 B1 | 7/2002 | Lee et al. | 264/328.1 |
| 6,436,320 B1 | 8/2002 | Kazmer et al. | 264/40.1 |
| 6,464,909 B1 | 10/2002 | Kazmer et al. | 264/40.1 |
| 6,514,440 B1 | 2/2003 | Kazmer et al. | 264/39 |
| 6,554,604 B1 | 4/2003 | Schmidt | |
| 6,585,505 B2 | 7/2003 | Kazmer et al. | |
| 6,632,079 B1 | 10/2003 | Kazmer et al. | |
| 6,638,049 B1 | 10/2003 | Moss et al. | |
| 6,767,486 B2 | 7/2004 | Doughty et al. | 264/40.1 |
| 7,029,268 B2* | 4/2006 | Doyle et al. | 425/562 |
| 2002/0086086 A1 | 7/2002 | Doyle et al. | |
| 2002/0121713 A1 | 9/2002 | Moss et al. | |
| 2002/0190413 A1 | 12/2002 | Kazmer et al. | |
| 2003/0012845 A1 | 1/2003 | Moss et al. | |
| 2003/0155672 A1 | 8/2003 | Moss et al. | |
| 2003/0180409 A1 | 9/2003 | Moss et al. | |
| 2003/0198702 A1 | 10/2003 | Moss et al. | |
| 2007/0224303 A1* | 9/2007 | Vasapoli et al. | 425/146 |

FOREIGN PATENT DOCUMENTS

| | | |
|---|---|---|
| CA | 2246771 | 1/2002 |
| DE | 203 41 63 | 2/1971 |
| DE | 24 01 168 | 7/1975 |
| DE | 299 09 535 | 8/1999 |
| DE | 19811466 A1 | 9/1999 |
| EP | 0 911 137 | 4/1999 |
| EP | 0940242 | 8/1999 |
| EP | 1 052 078 A1 | 11/2000 |
| EP | 1 142 686 A1 | 10/2001 |
| JP | 58-142833 | 8/1983 |
| JP | 60-212321 | 10/1985 |
| JP | 61-63428 | 4/1986 |
| JP | 06-339951 | 12/1994 |
| JP | 6-339951 | 12/1994 |
| WO | WO 97/43105 | 11/1997 |
| WO | WO 98/56564 | 12/1998 |
| WO | WO 99/54109 | 10/1999 |
| WO | WO 99/59795 | 11/1999 |
| WO | WO 01/08462 | 2/2001 |
| WO | WO 02/36324 A1 | 2/2002 |

OTHER PUBLICATIONS

Kazmer, David O., et al., "The Process Capability of Multi-Cavity Pressure Control for the Injection Molding Process," *Polymer Engineering and Science* (Nov. 1997) vol. 37, No. 11: 1880-1895.

Kazmer, David O., "Dynamic Feed Control: A New Method for Injection Molding of High Quality Plastic Parts," *A Dissertation submitted to the Design Division of Mechanical Engineering and the Committee on Graduate Studies in Partial Fulfillment of the Requirements for the Degree of Doctor of Philosophy in Mechanical Engineering,* Jun. 1995, (ii-xix, 2-199).

Abstract—Japanese Publication No. 20 00141439, May 23, 2000, Kobe Steel Ltd., "Injection Compression Molding Device."

Abstract—Japanese Publication No. 58 142833, Aug. 25, 1983, Kobe Steel Ltd., "Control Method for Injection Molding Machine".

Abstract—Japanese Publication No. 60 212321, Oct. 24, 1985, Yazaki Kako KK, "Quantity Control of Resin for Injection Compression Molding".

Abstract—Japanese Publication No. 63 166511, Jul. 9, 1988, Nissei Plastics Ind. Co., "Injection Molding."

International Search Report, mailed Feb. 2, 1999, PCT/US98/10798.

International Search Report, mailed Jun. 22, 2001, PCT/US01/04674.

European Search Report, dated Feb. 28, 2001, EP Application No. 00 12 4358.

International Search Report, dated Aug. 3, 2002, PCT/US01/42795.

International Search Report, dated Jun. 5, 2002, PCT/US02/08364.

* cited by examiner

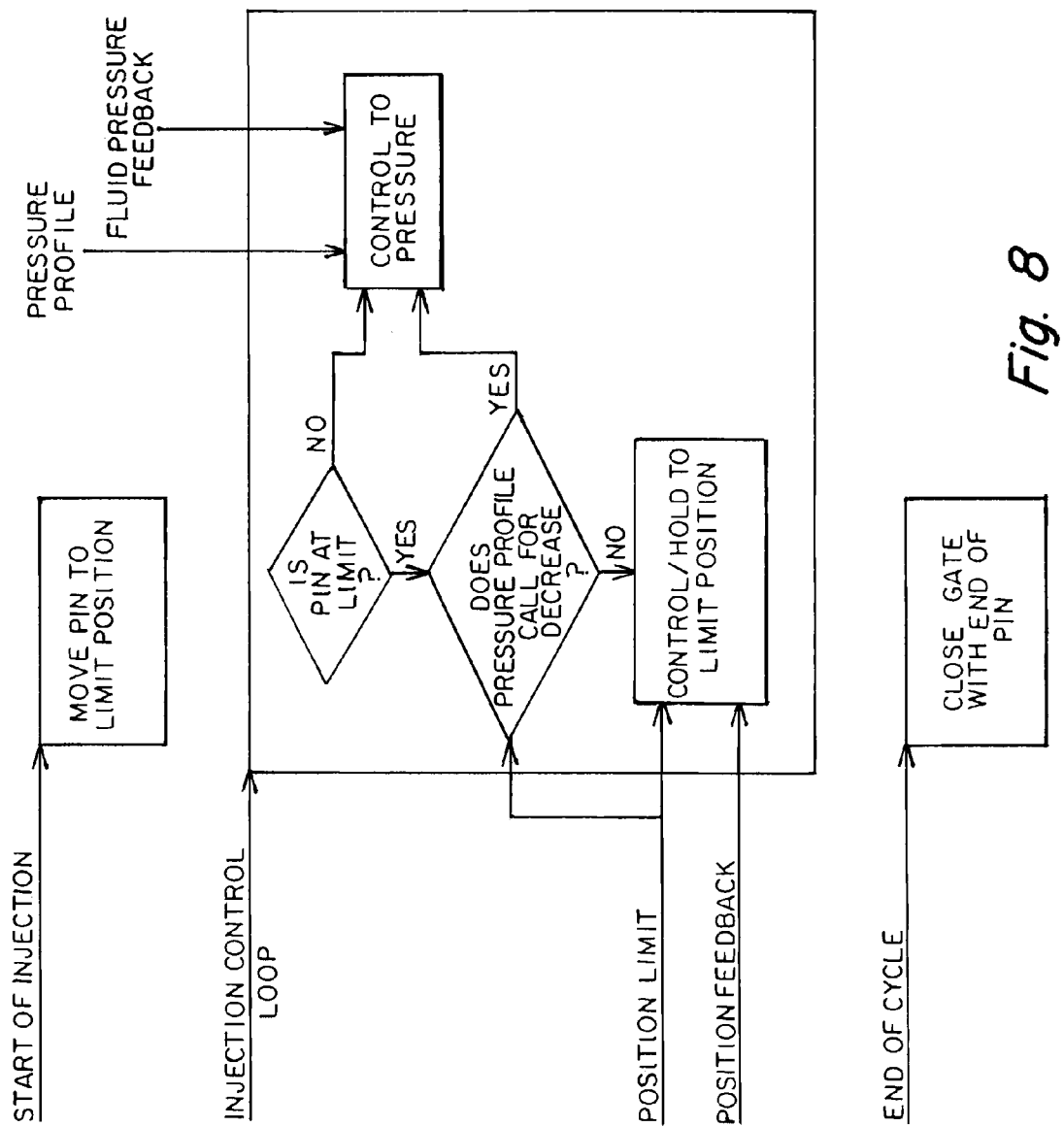

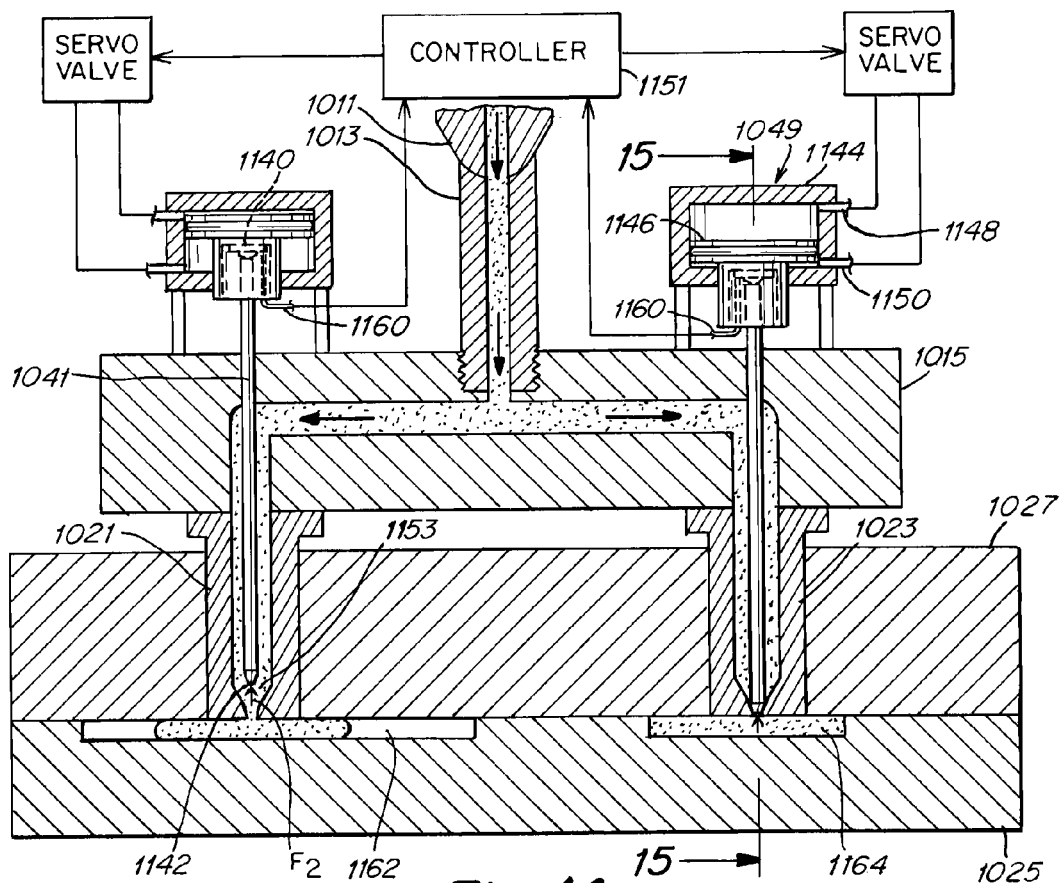
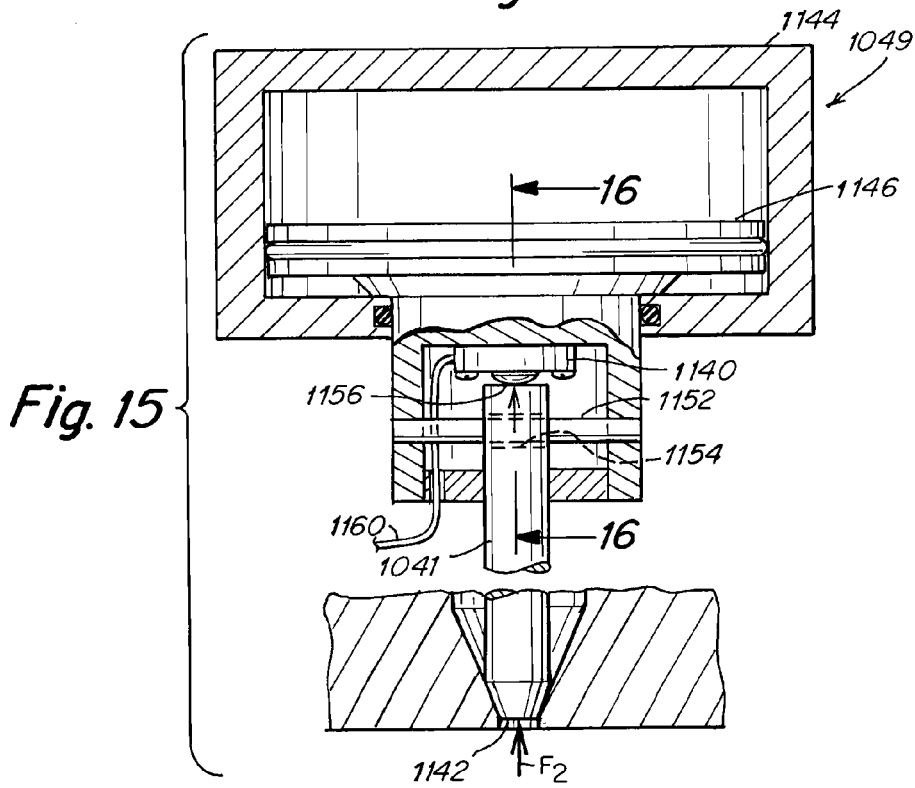
Fig. 14
Fig. 15

INJECTION MOLDING FLOW CONTROL APPARATUS AND METHOD

RELATED APPLICATIONS

This application is a continuation of and claims the benefit of priority of U.S. patent application Ser. No. 11/757,577 filed Jun. 4, 2007 now U.S. Pat. No. 7,419,625 (now allowed) which is a continuation of 10/455,881 filed Jun. 6, 2003 (now U.S. Pat. No. 7,234,929) which in turn claims the benefit of priority under 35 usc Section 119 to U.S. provisional patent application Ser. No. 60/431,923 filed Dec. 9, 2002, the disclosures of all of which are incorporated herein by reference in their entirety as if fully set forth herein. U.S. patent application Ser. No. 10/455,881 now U.S. Pat. No. 7,234,929 (of which U.S. Ser. No. 11/7575,577 is a continuation) is in turn a continuation-in-part of U.S. patent application Ser. No. 10/269,927 filed Oct. 11, 2002 now abandoned which is a continuation of U.S. Application Ser. No. 09/400,533 issued as U.S. Pat. No. 6,464,909 on Oct. 15, 2002 which is a continuation-in-part of U.S. Ser. No. 09/400,533 filed Sep. 21, 1999 now U.S. Pat. No. 6,646,909 (claiming priority to U.S. Provisional Ser. No. 60/124.596 filed Mar. 16, 1999) and which is a continuation-in-part of U.S. Ser. No. 09/063,762 filed Apr. 21, 1998 now issued as U.S. Pat. No. 6,361,300. This application claims the benefit of priority to/of all of the foregoing applications and issued patents and further incorporates the disclosures of all of the foregoing applications and patents herein by reference in their entirety as if fully set forth herein.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300, 6,464,909, U.S. patent application Ser. No. 10/214,118, filed Aug. 8, 2002 (7006), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar. 19, 2002 (7070).

BACKGROUND OF THE INVENTION

Injection molding systems have been developed having flow control mechanisms that move at high speed over relatively short periods of time to control the rate of flow of fluid material that is being injected to a mold cavity. The range of distance of movement or travel of the flow control mechanisms is also relatively small. Computer/algorithm electronic controls have been developed to effect such movements on the basis of a variable input that corresponds to a sensed condition of the fluid material being injected or another sensed property, state or condition of a component of the apparatus or the energy, pressure or power used to operate an operating mechanism associated with the apparatus that is used to control the flow velocity of the fluid material.

The accuracy and precision of such algorithmically controlled movement depends on the accuracy/precision of the sensed condition as a measure of flow velocity at any given point in time or at any given location within the fluid flow stream where the fluid or machine property is being sensed by a sensor.

SUMMARY OF THE INVENTION

In accordance with the invention there is provided an injection molding apparatus comprising: a manifold having a channel for delivering a flow of a fluid material to a gate of a mold cavity during an injection cycle; a fluid flow controller adapted to move within the channel along a path of travel; a position sensor for detecting one or more positions of the fluid flow controller along the path of travel; a master controller interconnected to the fluid flow controller for controlling movement of the fluid flow controller along the path of travel, the master controller including an algorithm having a set of instructions that limit the extent of travel of the fluid flow controller along the path of travel during the injection cycle to one or more preselected positions, the one or more preselected positions being detected by the position sensor, the position sensor sending a signal indicative of detection of the one or more preselected positions of travel to the master controller during the injection cycle, the master controller limiting travel of the fluid flow controller beyond the one or more preselected positions upon receipt of the signal.

The one or more preselected positions typically comprise one or more positions at which the fluid flow controller allows flow of the fluid material through the channel at a maximum rate of flow.

The algorithm can include a set of instructions that control movement of the fluid flow controller beyond the one or more preselected positions upon occurrence of a predetermined event during the injection cycle. The predetermined event typically comprises one or more of (a) an expiration of a predetermined amount of time from a selected point in time during an injection cycle, (b) detection of a selected degree of a condition of the fluid material or (c) detection of a selected degree of a selected property, position or operating condition of an operating component of the hotrunner/manifold apparatus or the injection molding machine.

The fluid flow controller is preferably movable along the path of travel between a range of variable flow rate positions, a range of maximum flow positions and one or more closed flow positions, wherein the one or more preselected positions to which travel of the flow controller is limited during the injection cycle comprise one or more of the maximum flow positions.

The apparatus preferably further comprises a material condition sensor that senses a selected condition of the fluid material, the algorithm utilizing a value indicative of the sensed condition as a variable to control movement of the fluid flow controller to one or more variable flow rate positions along the path of travel. The material condition sensor typically comprises a pressure sensor.

The fluid flow controller typically comprises a valve pin having a first end interconnected to an actuator and a control surface distal of the first end that is movable to a plurality of varying flow rate positions, the actuator being interconnected to the algorithm, the algorithm including a set of instructions for controlling movement of the control surface to the one or more varying flow rate positions during the injection cycle.

The valve pin can have a second end that closes the gate in a forward closed position, the control surface being intermediate the first and second ends and controllably movable to the plurality of varying flow rate positions. The valve pin is preferably movable between the plurality of varying flow rate positions, a range of maximum flow positions and the forward closed position, wherein the one or more preselected positions to which travel of the flow controller is limited during the injection cycle comprise one or more of the maximum flow positions.

Upstream movement of the valve pin to successive ones of the plurality of varying flow rate positions typically decreases the rate of flow of fluid material.

In another aspect of the invention there is provided an injection molding apparatus comprising a manifold having a channel for delivering a flow of a fluid material to a gate of a mold cavity during an injection cycle; a valve pin adapted to reciprocate through the channel along a path of travel; a condition sensor for detecting a selected condition of the fluid material; a position sensor for detecting one or more positions of the valve pin along the path of travel; a controller interconnected to the valve pin for controlling movement of the valve pin along the path of travel, the controller including an algorithm having a set of instructions that control movement of the valve pin to a plurality of varying flow rate positions along the path of travel based on values determined by the selected condition of the fluid material sensed by the condition sensor during the injection cycle; the algorithm including a set of instructions that limit the extent of upstream or downstream travel of the pin along the path of travel during the injection cycle to one or more preselected positions, the one or more preselected positions being detected by the position sensor, the position sensor sending a signal indicative of detection of the one or more preselected positions of travel to the controller during the injection cycle.

In another aspect of the invention there is provided an injection molding apparatus comprising a manifold having a channel for delivering a flow of a selected fluid material to a gate of a mold; a valve pin adapted to reciprocate through the channel, the valve pin having a first end coupled to an actuator, a second end that closes the gate in a forward closed position, and a control surface intermediate said first and second ends for adjusting the rate of material flow during an injection cycle, wherein the actuator is interconnected to a controller having a program for controlling reciprocation of the valve pin according to a predetermined algorithm; a condition sensor for detecting a selected condition of the fluid material, the algorithm utilizing a value determined by the selected condition detected by the condition sensor to control reciprocation of the valve pin; a position sensor that senses position of the valve pin, the algorithm utilizing a value determined by one or more sensed positions of the valve pin to limit movement of the valve pin during the injection cycle beyond the one or more sensed positions during the injection cycle.

The invention also provides a valve assembly for controlling fluid flow rate in an injection molding apparatus, wherein the assembly comprises:

an actuator comprising a housing and a driven piston slidably disposed within the housing for reciprocal movement within the housing to one or more fluid flow rate control positions, the actuator being interconnected to a fluid flow controller and a master controller having an algorithm that includes a set of instructions for controlling movement of the piston;

a position sensor adapted to sense movement of the piston or the fluid flow controller, the position sensor being interconnected to the master controller for sending signals indicative of the position of the piston to the master controller, the algorithm utilizing values corresponding to the signals sent by the position sensor.

The invention further provides a method for controlling injection of a fluid through a gate of a mold cavity in an injection molding apparatus, the injection molding apparatus comprising a manifold having a channel for delivering a flow of the fluid material to the gate of the mold cavity during an injection cycle and a fluid flow controller adapted to be moved by an actuator to a plurality of positions along a path of travel within the channel, the method comprising:

predetermining one or more positions along the path of travel during an injection cycle that generate a rate of flow of the fluid material by the fluid flow controller that fills the mold cavity with the fluid material according to a predetermined profile of one or more positions;

injecting the fluid through the channel;

sensing the one or more positions of the fluid flow controller along the path of travel;

sending signals corresponding to the sensed one or more positions to a controller for controlling movement of the fluid flow controller to the predetermined one or more positions along the path of travel according to an algorithm;

inputting values corresponding to the sent signals to the algorithm, the algorithm having a set of instructions that compare the input values to a stored set of values corresponding to the predetermined one or more positions and a set of instructions that instruct the actuator to move the fluid flow controller to the predetermined one or more positions during the injection cycle.

There is also provided a method for controlling injection of a fluid through a gate of a mold cavity in an injection molding apparatus, the injection molding apparatus comprising a manifold having a channel for delivering a flow of the fluid material to the gate of the mold cavity during an injection cycle and a fluid flow controller adapted to be moved by an actuator to a plurality of positions having a pressure at each position along a path of travel within the channel, the method comprising:

predetermining one or more pressures of the fluid material corresponding to a respective one or more positions of the fluid flow controller along the path of travel that generate a rate of flow of the fluid material by the fluid flow controller that fills the mold cavity with the fluid material at a predetermined rate of fill during the injection cycle;

injecting the fluid through the channel under pressure during an injection cycle;

sensing the pressure of the injected fluid during the injection cycle;

sending signals corresponding to the sensed pressure to a controller for controlling movement of the fluid flow controller according to an algorithm;

predetermining a limit position for the fluid flow controller;

sensing the position of the fluid flow controller during the injection cycle;

sending signals corresponding to the sensed position to the controller;

inputting values corresponding to the sent pressure and position signals to the algorithm, the algorithm having a set of instructions that compare the input pressure values to a stored set of values corresponding to the predetermined one or more pressures and a set of instructions that compare the input position values to a value corresponding to the predetermined limit position;

the algorithm including a set of instructions that instruct the actuator to move the fluid flow controller to the predetermined one or more position corresponding to the predetermined one or more pressures during the injection cycle;

the algorithm further including a set of instructions that instruct the actuator to limit movement of the fluid flow controller to the limit position during selected periods of time during the injection cycle.

BRIEF DESCRIPTION OF THE DRAWINGS

The above and further advantages of the invention may be better understood by referring to the following description in conjunction with the accompanying drawings in which:

FIG. 8 is a flow chart showing an algorithm that can be used in the master controller of the FIG. 1 system for controlling movement of the actuator and valve pin during an injection cycle, the algorithm using as control variables signals that are indicative of both the position of the cylinder/pin and a selected property (such as pressure) of the fluid being routed through a flow channel of the manifold;

FIG. 14 is a cross-sectional partially schematic view of another alternative embodiment of an injection molding system having flow control in which a load cell behind the valve pin is used to control the flow rate in each injection nozzle;

FIG. 15 is a enlarged fragmentary cross-sectional view of the valve pin and actuator of FIG. 14;

DETAILED DESCRIPTION

Figure 1:
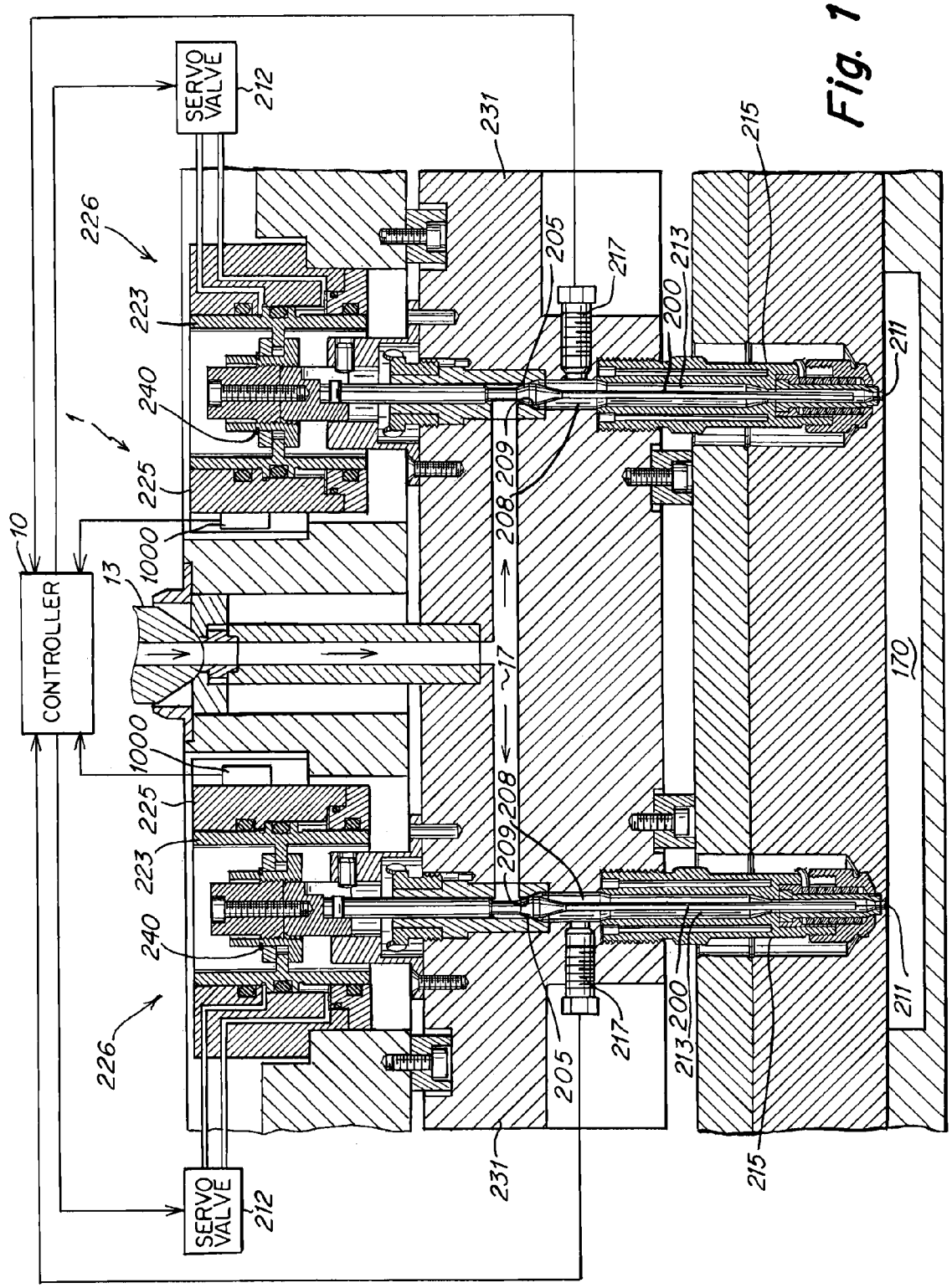
FIG. 1 is a schematic cross-sectional view of one embodiment of an injection molding system according to the present invention.

FIG. 1 shows one embodiment of an injection molding system 1 according to the present invention having a pair of valve gated nozzles 215 delivering fluid material to gates 211, which in turn communicate with and deliver fluid material to mold cavity 170. Fluid material is injected initially under pressure from injection molding machine barrel 13 into a main injection channel 17 formed in heated manifold 231 and travels from channel 17 to the bores or channels 208, 213 of nozzles 215. As shown in FIGS. 1, 4-6 an embodiment using an extended pin 200 is disposed within channels 208, 213 for slidable reciprocating movement along the axes of channels 208, 213. Channel 17 mates/communicates with bores 208, 213 at an elbow at which a throat or restricted channel section is disposed where a gap 207 can be formed for controlling material flow rate upstream or away from the gate as described below.

In the FIG. 1 embodiment, a master controller 10 typically comprising a data processor and memory components for processing and storing digital data controls the movement of actuators 226 which in turn control the reciprocal movement of pins 200. In the FIG. 1 embodiment, the master controller 10 receives signals from both position sensors and material condition sensors. A generic position sensor is designated as item 1000 in FIG. 1. Position sensor 1000 can comprise a variety of types of position sensing mechanisms as described below. Although shown mounted on the side of the housing 225 of actuators 226 in FIG. 1, depending on the precise type of position sensor and the precise type of actuator or other mechanical component of the apparatus whose position is to be measured, position sensor 1000 is mounted in a location that is most appropriate to sensing the position of the mechanical component to be monitored.

As shown in FIG. 1 the master controller 10 sends control signals to servo-valves 212 which control the input and out-flow of hydraulic or pneumatic fluid to the sealed chambers of actuators 226. The actuators 226 may comprise electrically driven actuators as described for example in U.S. Pat. No. 6,294,122 the disclosure of which is incorporated by reference in its entirety as if fully set forth herein. Servo-control mechanisms can be interconnected between the master controller 10 and an electric actuator, the servomechanism receiving the digital signal output of controller 10 for precisely controlling the drive and movement of the shaft of the electric actuator in the same functional manner as the fluid driven actuators 26 are described herein. Shooting pot rams or cylinders as described in U.S. Pat. Nos. 6,464,909 and 6,287, 107 can also be used in place of valves and valve pins for controlling fluid flow according to the invention. In each case where a particular actuator and its associated servomechanism is used, whether a valve pin, rotary valve or shooting pot ram/cylinder controlled by a hydraulically, pneumatically or electrically driven mechanism, a position sensing mechanism can be used to sense the travel or position of the pin, rotary valve or ram/cylinder and send a position indicative signal to the master controller 10 that includes an algorithm having instructions that use a value corresponding to the position indicative signal to control movement of the valve pin, rotary valve or ram/cylinder in a manner as disclosed and claimed herein.

Although only two nozzles and gates are shown in FIG. 1, the invention contemplates embodiments that simultaneously control the material flow through a plurality of more than two nozzles to a plurality of gates. In the embodiment shown, the injection molding system 1 is a single cavity 170 system. The present invention can be adapted to any of a variety of systems where several nozzle bores or downstream channels 183, 185 feed two or more cavities of the same size/configuration or separate cavities of different size/configuration or where several bores or channels feed a single non-uniform cavity at different locations/points of entry where the volumes to be filled at entry are different as described in, for example, U.S. patent application Ser. No. 10/328,457 filed Dec. 23, 2002, the disclosure of which is incorporated herein by reference in its entirety as if fully set forth.

A system according to the invention injects plastic material which is heated/melted to a fluid form and injected through the heated manifold 231 which maintains the plastic material in fluid form. The invention is also applicable to other types of injection systems in which it is useful to control the rate at which another fluid material, e.g., metallic or composite materials is delivered to a cavity of a mold.

Figure 2:
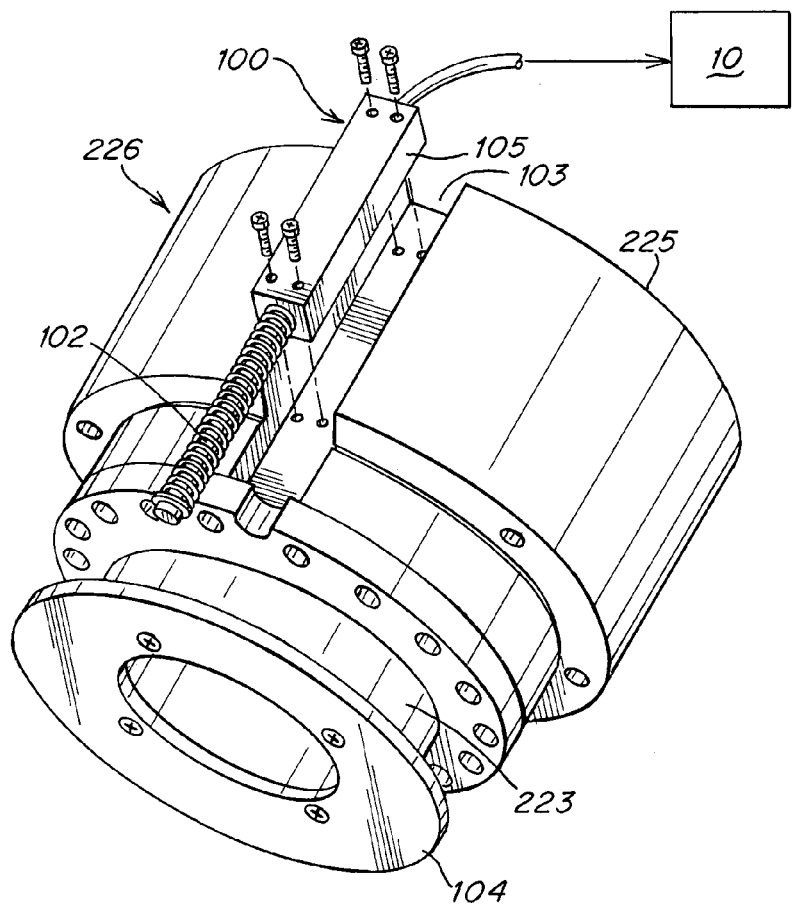
FIG. 2 is an isometric exploded view of an actuator usable in the FIG. 1 embodiment showing a linear position sensor mountable to an outside surface of the actuator housing for use in sensing the position of the actuator cylinder and its associated valve pin along its path of travel within the bore/channel of a nozzle leading to the gate of the mold cavity of the FIG. 1 embodiment.
Figure 3:
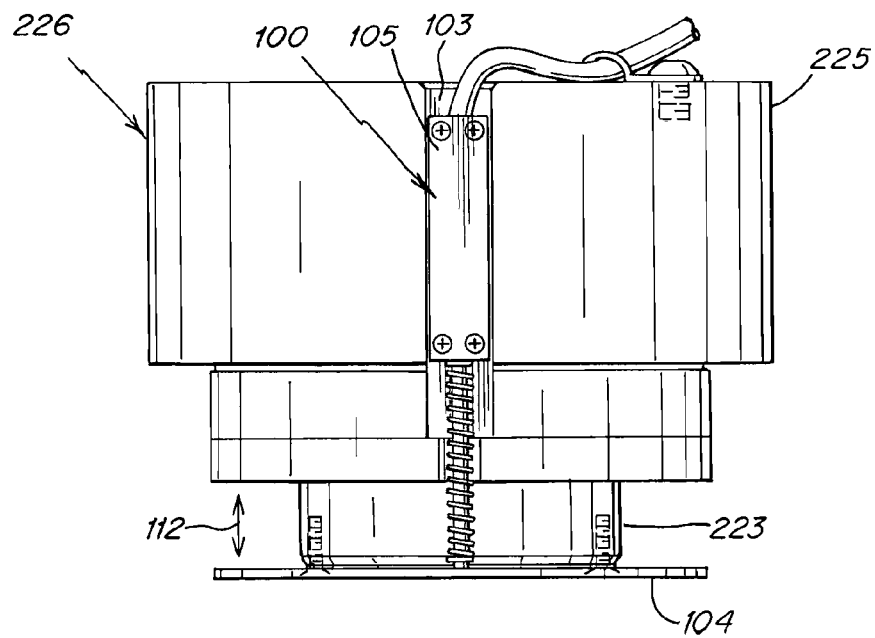
FIG. 3 is a partially schematic, side cross-sectional view of the position sensor mounting arrangement shown in FIG. 2.

The rate at which fluid material is delivered through the channels 13, 17, 208, 213 of the FIG. 1 embodiment is controllably varied by the enlarged bulbous protrusion formed along the length of the valve pin 200. As shown in FIGS. 1, 4-6 the valve pin 200 is interconnected at a proximal end to the sliding piston 223 mounted in cylinder housings 225 of actuators 226 which in turn are interconnected to servo-controllers 212 which are in turn interconnected to master controller 10. As shown in the FIGS. 4-6 embodiment, the master computer or controller 10 receives signal inputs indicative of a position of the valve pins 200 and their associated pistons 223 from position sensors 100. The position sensors 100 are mountable on the actuators 226 of FIG. 1 as shown in FIGS. 2, 3 within a slot 103 that can be provided on the side or outer surface of cylinder housing 225 that is lateral to the axis of movement of the piston 223. The position sensors 105 sense the position of travel or stroke 112 of the pins 200 via a sliding rod 102 interconnected to plate 104 which is attached to a distal end of piston 223 as shown in FIGS. 2, 4-6. The sliding rod 102 is spring loaded to maintain contact with the plate at one end and is interconnected to a potentiometer provided within sensor 105 at another end. The potentiometer 105 is interconnected via wiring 105 to controller 10 and sends a voltage signal that varies with the position of the sliding rod 102 which follows and is indicative of the position of travel or stroke 112 of the pin 200 and the piston 223 to which the pin 200 is connected. The controller 10 receives the variable voltage signal and converts the signal to a value indicative of piston 223 and pin 200 position that is processable by the algorithm. The controller 10 includes an algorithm which uses as a variable, a value indicative of the position signal received from sensor 105 to control the movement of the position of the pins 200 during an injection cycle according to a target profile of pin positions that has been predetermined in advance for the entire injection cycle as described more fully below.

Other valve and pin embodiments are usable in the invention. A particularly suitable valve and pin design is described in U.S. patent application publication no. 2002/0086086, published Jul. 4, 2002, the disclosure of which is incorporated herein by reference in its entirety as if fully set forth herein. The pin and valve design of this application show a pin having extended curvilinear bulb upstream of the distal end of the pin. The bulb controls flow rate upstream and away from the gate while the distal end of the pin closes the gate in a manner analogous to the FIGS. 1, 4-6 valve and pin embodiment described herein. FIGS. 32-34A of publication no. 2002/0086086 illustrate flow stopped, flow enabled/controlled and gate closed positions analogous to the positions and configuration depicted in FIGS. 1, 4-6 herein.

Figure 4:
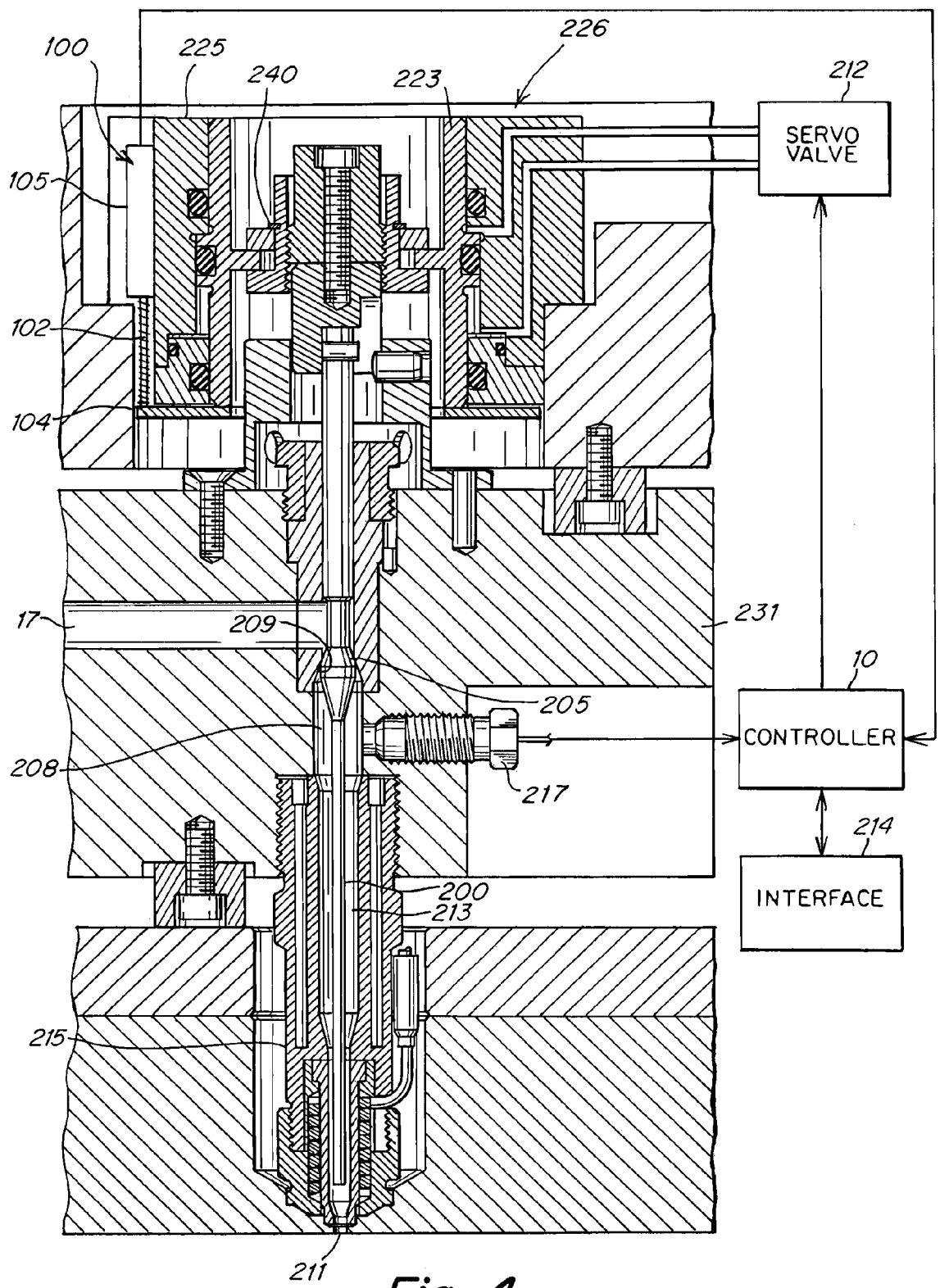
FIGS. 4-6 are side cross-sectional views of an actuator/pin/nozzle assembly as shown in FIG. 1 showing a linear position sensor mounted thereon as shown in FIGS. 2, 3, the valve pin being shown in three operating positions during the course of an injection cycle, the start closed position shown in FIG. 4, an intermediate flow enabled position shown in FIG. 5 and a maximum flow position shown in FIG. 6.
Figure 4A:
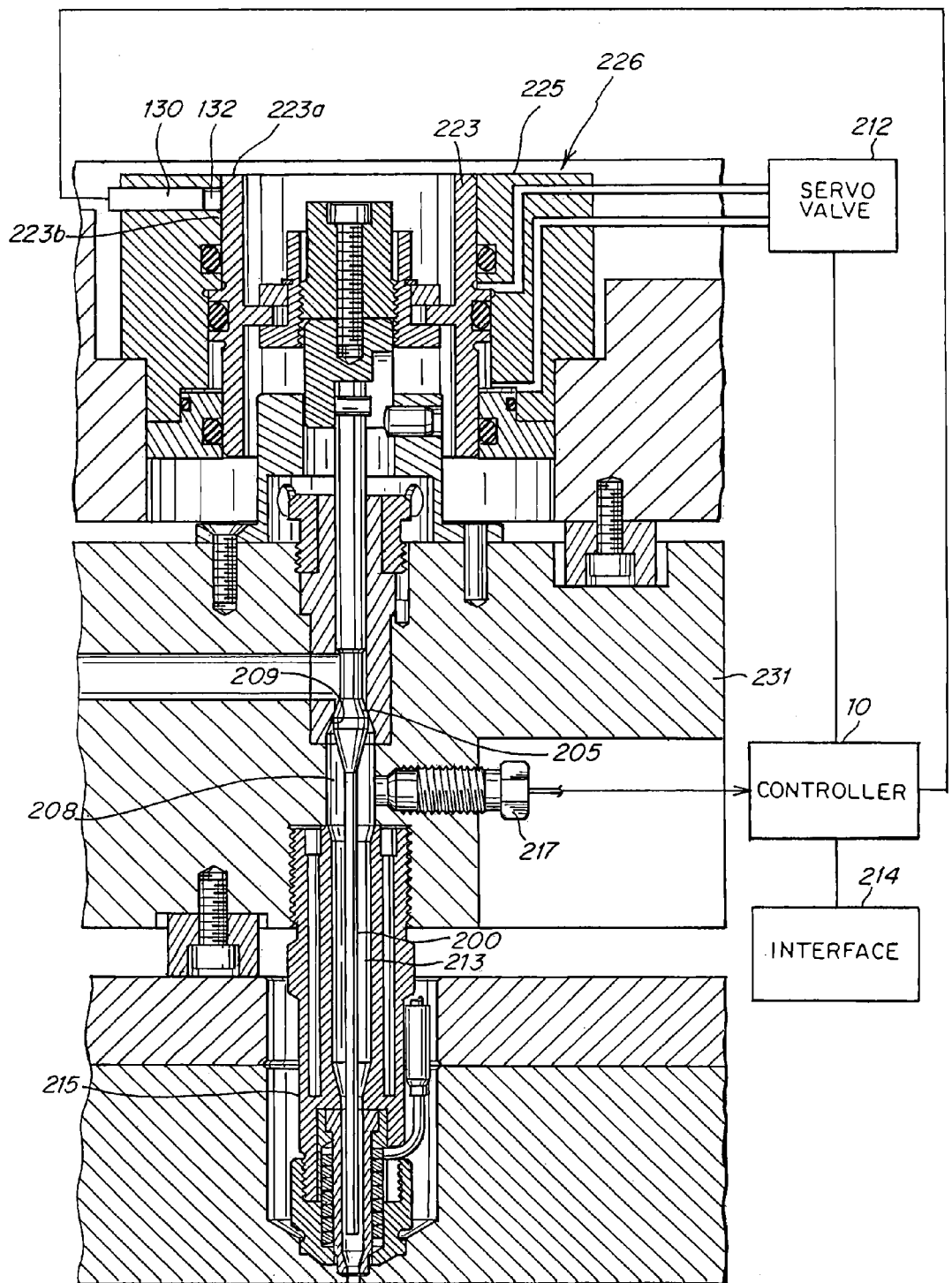
FIG. 4a is a side cross-sectional view of another embodiment of the invention showing an actuator/pin/nozzle assembly as shown in FIG. 1 having a switch that detects the position of the piston of the actuator through a window by electromagnetic or magnetic means.
Figure 7:
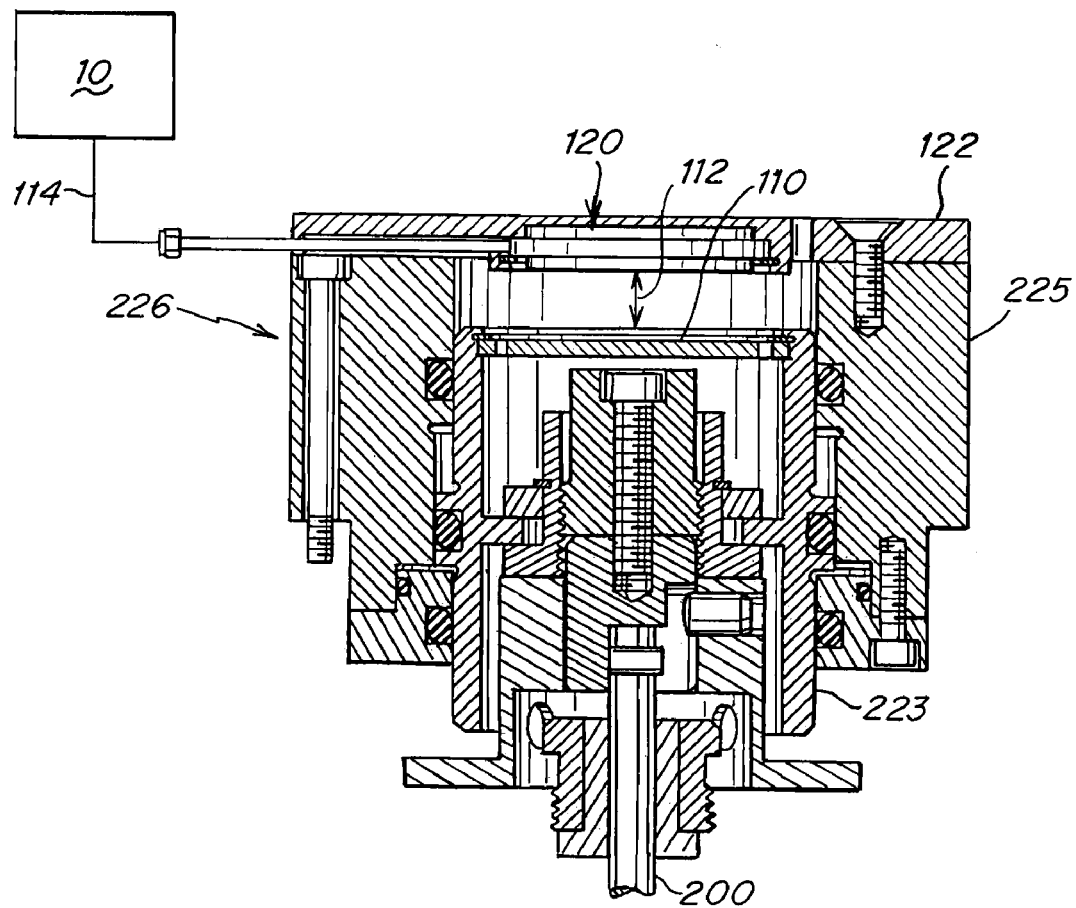
FIG. 7 is a partially schematic, side cross-section view of an actuator/pin assembly as shown in FIG. 1 with an alternative type of inductive position sensor mounted at a rear end of the actuator for sensing/recording the position of travel of the cylinder and its associated valve pin.
Figure 9A:
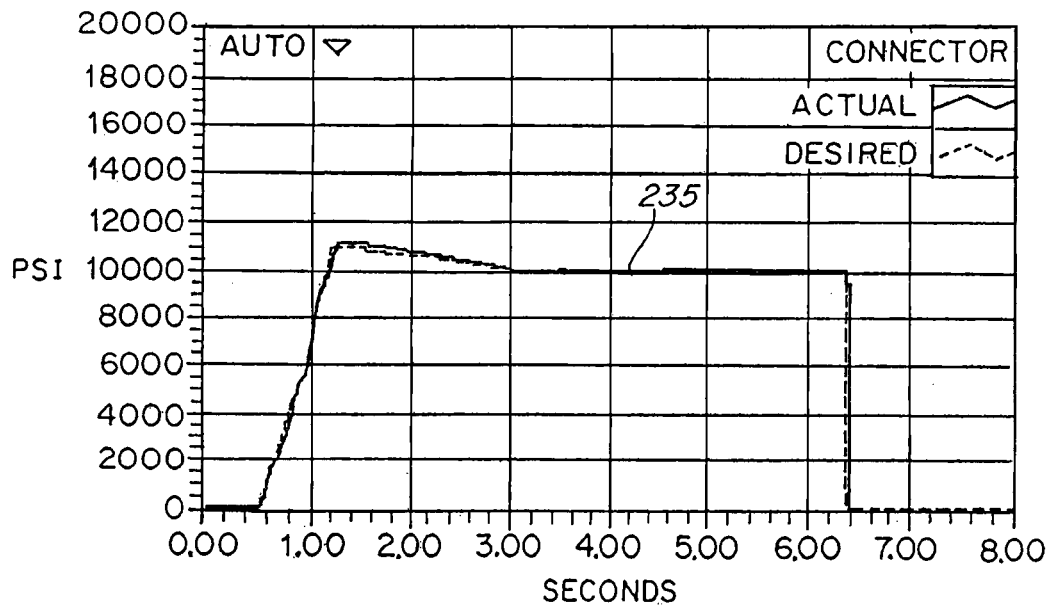
FIGS. 9a-d shows a series of examples of graphs representing actual pressure versus target pressures measured in four injection nozzles having position and pressure sensors coupled to a manifold as shown in FIG. 1.
Figure 9B:
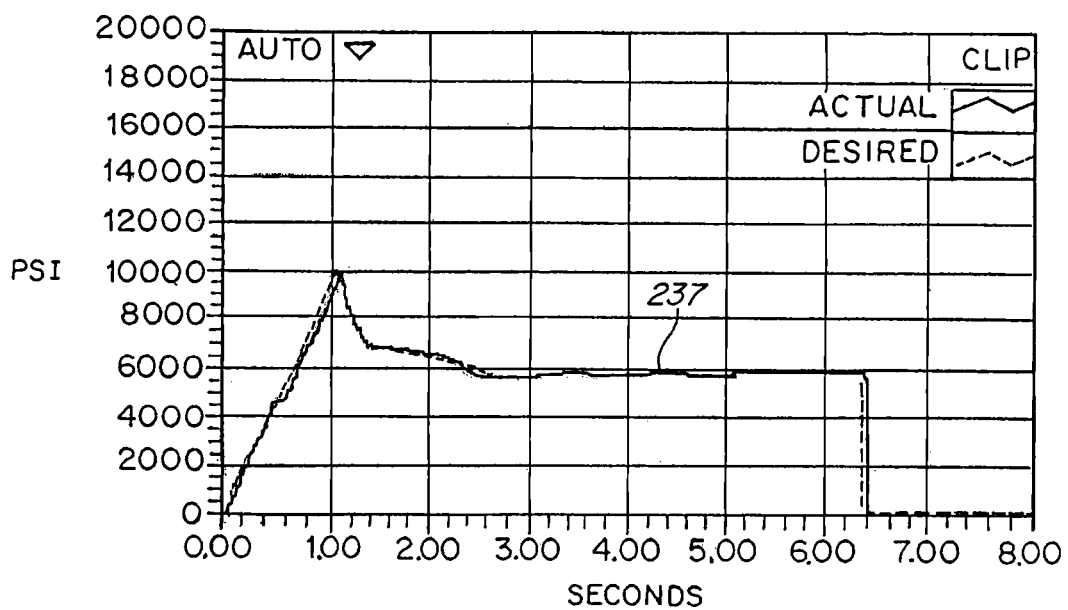
Figure 9C:
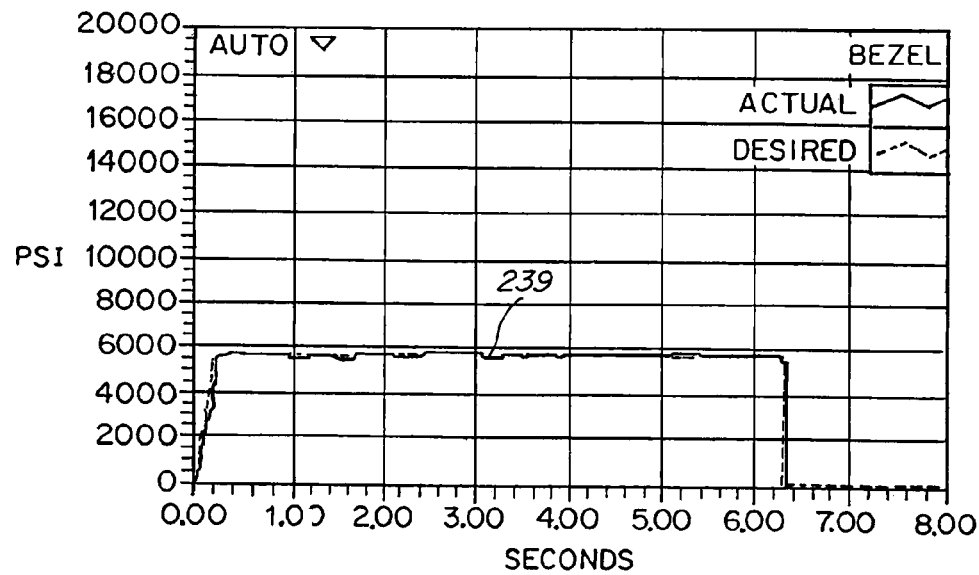
Figure 9D:
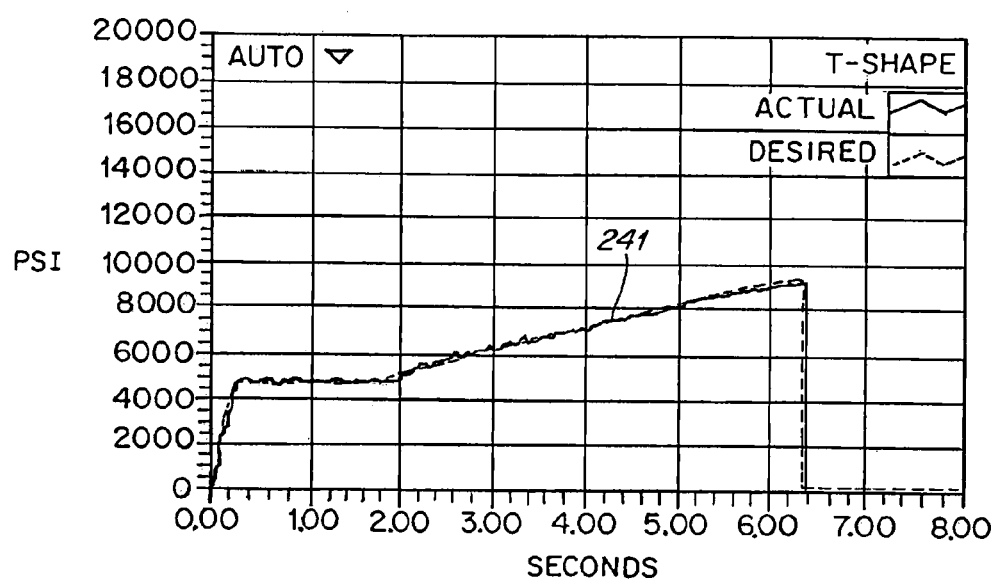

Position sensors used in conjunction with the invention typically comprise a mechanism that generates a signal that varies according to the length, degree or amount of travel position of the piston or flow controller to which the sensor is connected or interacting with. Such continuously varying output sensors typically generate an output that varies in degree of signal strength such as voltage, amperage or the like. The sensors described with reference to FIGS. 4, 4a, 7 are continuously varying signal sensors. Alternatively, as described with reference to the FIG. 4b embodiment, a sensor mechanism having a switch that generates/provides an on or off signal (e.g. a toggle switch) can be used in other embodiments of the invention where a sensor signal that continuously varies in degree/strength is not feasible for use in connection with a particular hotrunner/actuator arrangement.

Figure 4B:
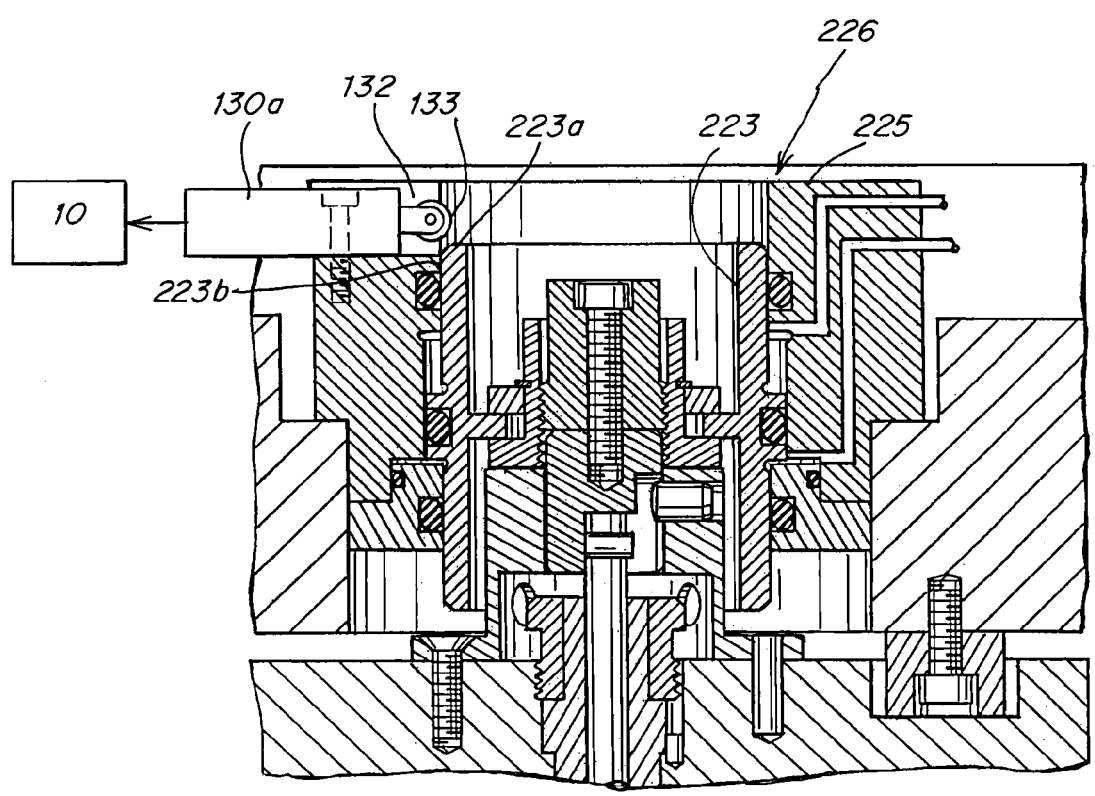
FIG. 4b is a side cross-sectional view of another embodiment of the invention showing an actuator/pin/nozzle assembly as shown in FIG. 1 having a switch that detects the position of the piston of the actuator by mechanical contact means.
Figure 5:
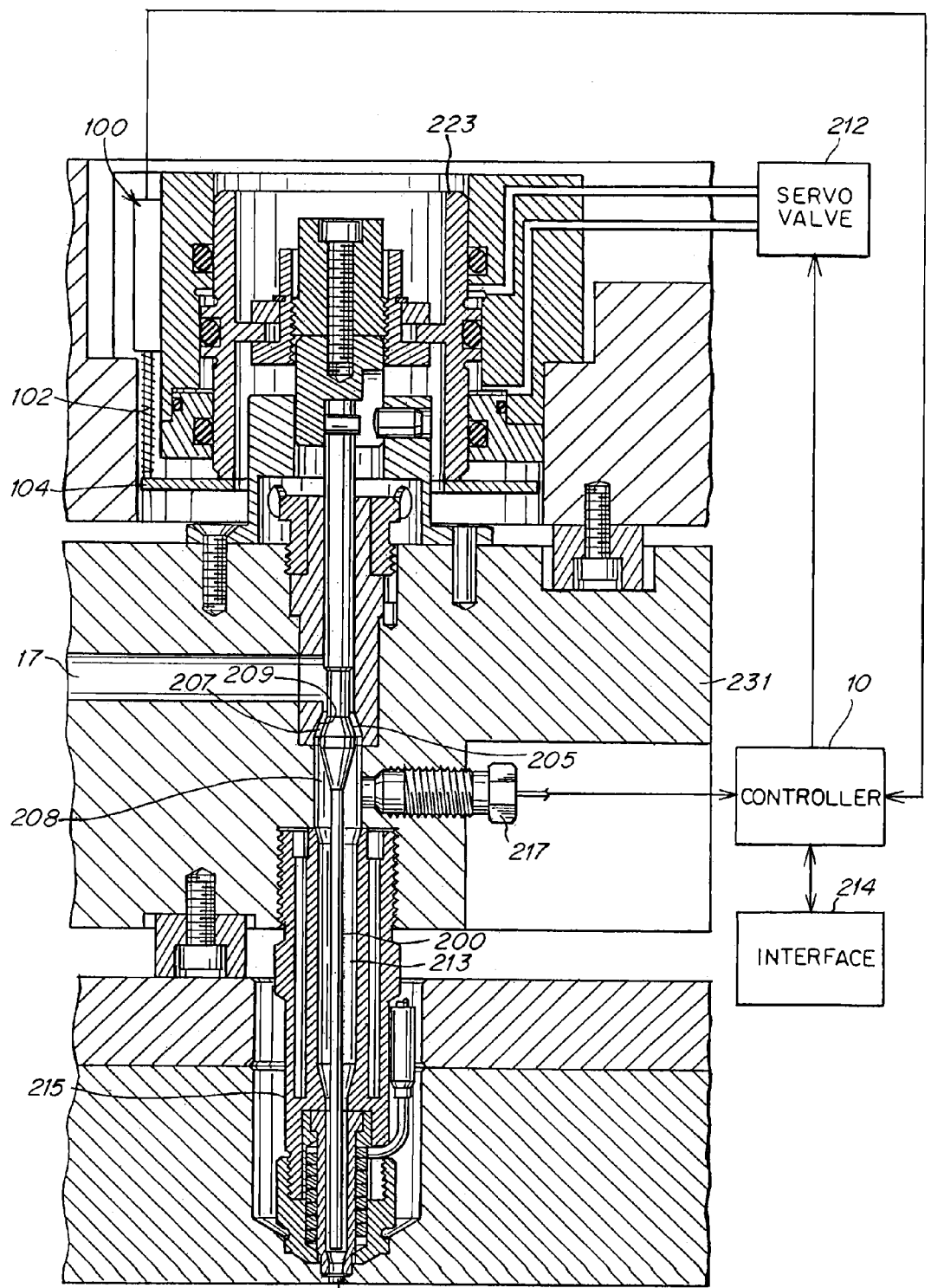

FIG. 4a shows an alternative position sensing embodiment wherein a magnetic or electromagnetic field is activated or sensed by sensor 130 depending on the position of the piston 223 relative to the position of mounting of the position sensor 130. As shown in FIG. 4a, a window 132 is provided in the upper portion of the piston housing which allows the magnetic or electromagnetic field sensitive switch 130, shown mounted on the housing 225, to sense the presence of the metal piston 223 through the window 132 when the piston 223 is in a position relative to the window 132 that is close enough to switch 130 to magnetically or electromagnetically activate switch 130. When the piston 223 travels to a position that is sufficiently clear of window 132, e.g to a position as shown in FIG. 5, the switch 130 stops signaling or changes its signal condition/content to controller 10 thus indicating that the piston 223 (and its associated pin 200) has traveled beyond a certain predetermined limit position. FIG. 4b shows another position sensor embodiment where the switch 130 comprises a mechanical, contact or interference switch 130a having a mechanical contact member 133 that protrudes radially a slight distance through window 132. Member 133 contacts piston 223 and switch 130a is activated when an upper edge 223a or outer surface 223b of piston 223 travels to a point that is longitudinally aligned with member 223 such that mechanical contact is made with member 133.

In the FIGS. 4a, 4b embodiments, the switch 130, 130a and the window 132 are arranged relative to each other such that switch 130 ceases sensing piston 223 or switch 130a loses contact with piston 223 when the piston 223 and pin 200 have traveled to a "limit position," i.e. a longitudinal position along the path of travel of the piston where a portion of the piston 223 is not aligned with window 132. When the switch 130, 130a ceases sensing or making contact with the piston 223, the controller 10 receives a signal from switch 130, 130a indicating that the switch is deactivated or otherwise different from whatever signal, if any, that the controller was previously receiving from switch 130, 130a when the switch was sensing or in contact with piston 223. Thus the controller 10 receives a signal indicative of the movement of the pin 200 or piston 223 to a position at or beyond the predetermined limit position. The limit position can be predetermined to be any selected position of the pin or piston occurring within the time interval of an injection cycle. In one embodiment, the limit position of the pin/piston is selected to be a position as shown in FIG. 5 where the pin is enabling fluid to flow at a maximum rate and/or the fluid is at a maximum pressure within the time interval of an injection cycle. As described below with reference to the FIGS. 1, 4-6 embodiments when the controller 10 receives a signal that the pin/piston has traveled to or beyond a selected limit position such as a maximum flow position, the algorithm includes instructions to direct movement of the pin in some predetermined manner, such as to direct the pin to move back from a maximum flow position to a position where the pin is in a range of pin positions that control flow rate at a rate less than maximum flow or otherwise where the fluid is not at maximum pressure. The detection and signaling of the piston's reaching the limit position is typically used by the controller 10 and in the control algorithm in the same manner as described in detail below.

FIG. 7 shows an alternative position sensing embodiment where an inductive position sensor 120 is mounted in a plate 122 that is mounted on the upper or rear surface of the housing 225 of actuator 226. The inductive position sensor 120 senses the position of travel of the piston 223 and its associated pin 200 by inductive sensing of the position of a sensor target 110 mounted on the upper or rear end 223a of piston 223. The position of travel or stroke distance 112 of the piston 223 is thus detected by inductance sensing and a signal 114 indicative of the position sensed can be sent to the master controller 10 as shown in FIG. 7 and used in an algorithm as described herein for controlling movement of the pin 200 according to the algorithm.

As shown in the FIG. 1 embodiment, the master computer or controller 10 receives signal inputs indicative of a fluid material condition from material condition sensors 217 and indicative of position of the pin from sensors 100. The sensors 217 as shown in FIG. 1 sense a condition of the fluid at a location or position that are downstream of the location at which that portion of the pins that control fluid flow rate are positioned. In the embodiment shown, the pins have bulbous protrusions with outer surfaces 205 that control fluid flow rate by forming a gap with a complementary inner surface of the flow channel. The condition sensors sense a condition of the fluid at a location or position that are downstream of the location at which fluid rate controlling surfaces 205 are positioned. As described below, in an embodiment where an extended pin, FIGS. 1, 4-6 is used to both control flow rate and shut off flow at the gate with the distal end of the pin, the use of a position sensor 100 signal in combination with a condition sensor signal to control flow rate during an injection cycle can work to prevent the controller 10 from instructing the actuator 226 to move the pin beyond a limit of forward/downstream travel that causes the distal end of the pin to prematurely close the gate and stop flow during the course of an injection cycle.

FIGS. 1, 4-6 show a system in which control of material flow is away from the gate. The embodiment shown utilizes an extended valve pin design in which the valve pin closes the gate after completion of material flow at the end of a cycle. The reverse taper pin controllably varies flow rate during a cycle by use of a reverse tapered control surface 205 for forming a gap 207 with a surface 209 of the manifold, FIGS. 4-6. The action of displacing the pin 200 in an upstream direction reduces the size of the gap 207, the maximum gap/flow position shown in FIG. 6, an intermediate gap/flow position shown in FIG. 5 and a stop flow/closed gap position shown in FIG. 4. Consequently, the rate of material flow through bores 208 and 214 of nozzle 215 and manifold 231, respectively, is reduced upon upstream movement from the FIG. 6 position to the FIG. 4 position, thereby reducing the pressure measured by the pressure transducer 217.

The valve pin 200 reciprocates by movement of piston 223 disposed in actuator body 225. This actuator is described in U.S. Pat. No. 5,894,025 the disclosure of which is incorporated herein by reference in its entirety. The use of this embodiment of an actuator 226 enables easy access to valve pin 200 in that the actuator body 225 and piston 223 can be removed from the manifold and valve pin simply by releasing retaining ring 240.

Forward or downstream moving closure pins may also be used in conjunction with the position sensing flow control apparatus and method of the present invention. Such forward or downstream movement pins are described in detail in U.S. Pat. No. 6,361,300. In the forward closure method, the flow control gap between the bulbous protrusion of the pin and the manifold (or nozzle) bore surface decreases flow rate and pressure by forward movement with complete closure occurring upon maximum forward movement as described in U.S. Pat. No. 6,361,300. Algorithms can be included in controller 10 for controlling pin (or ram/cylinder used in conjunction with a shooting pot) position based on pin position sensing in the same manner as described herein for the reverse taper or upstream closure movement pin embodiments.

Figure 6:
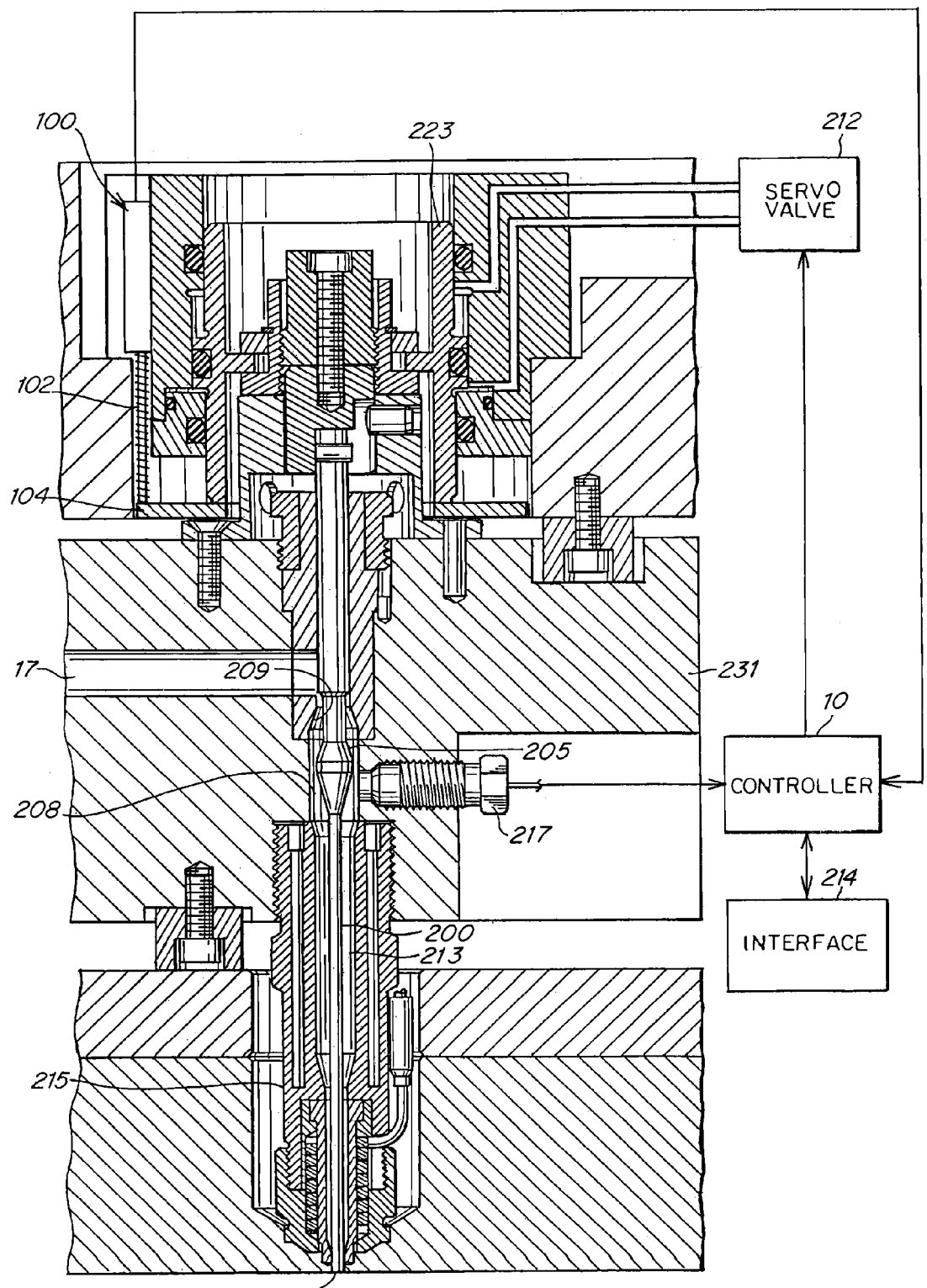

FIGS. 4-6 show the valve pin in three different positions. FIG. 4 represents the position of the valve pin at the start of an injection cycle. Generally, an injection cycle includes: 1) an injection period during which substantial pressure is applied to the melt stream from the injection molding machine to inject the material in the mold cavity; 2) a reduction of the pressure from the injection molding machine in which melt material is packed into the mold cavity at a relatively constant pressure; and 3) a cooling period in which the pressure decreases to zero and the article in the mold solidifies. Just prior to the start of injection, tapered control surface 205 is in contact with manifold surface 209 to prevent any material flow. At the start of injection the pin 200 will be opened to allow material flow. To start the injection cycle the valve pin 200 is displaced downstream toward the gate to permit material flow, as shown in FIG. 14. For applications where flow rates through different gates during a single injection cycle is different, not all the pins will be opened initially, for some gates pin opening will be varied to sequence the fill into either a single cavity or multiple cavities at different time and different rates of flow. FIG. 6 shows the valve pin at the end of the injection cycle after pack. The part is ejected from the mold while the pin is in the position shown in FIG. 15.

Pin position is controlled by a controller 10 based on position or pressure readings from one or both of sensors 100 or 217 that are fed to the controller 10. In a preferred embodiment, the controller is a programmable controller, or "PLC," for example, model number 90-30PLC manufactured by GE-Fanuc. The controller compares the sensed position or pressure to a target position or pressure and adjusts the position of the valve pin via servo valve 212 to track the target position or pressure, displacing the pin forward toward the gate to increase material flow (and pressure) and withdrawing the pin away from the gate to decrease material flow (and pressure).

In a preferred embodiment, the controller performs this comparison and controls pin position according to a PID algorithm.

The controller 10 performs these functions for all other injection nozzles coupled to the manifold 231 during a single injection cycle. Associated with each gate is a valve pin, rotary valve, ram, cylinder or some type of flow control mechanism to control the material flow rate. Also associated with each gate is either or both of a position sensor and material condition sensor, an input device for reading the output signal of the position and/or condition sensor, an algorithm for signal comparison and PID calculation (e.g., the controller 10), a program, memory and human interface for setting, changing and storing a target profile (e.g., interface 214), an output circuit or program for sending instruction signals to a servomechanism that is interconnected to and drives the actuator that is interconnected to and drives the pin, ram, rotary valve or the like that makes contact with the fluid flow, and an actuator to move/drive the valve pin, ram, cylinder, motor shaft or the like. The actuator can be pneumatically, hydraulically or electrically driven. The foregoing components associated with each gate to control the flow rate through each nozzle comprise a control zone or axis of control. Instead of a single controller used to control all control zones, individual controllers can be used in a single control zone or group of control zones.

An operator interface 214, for example, a personal computer, is provided to store and input a particular target profile of position or pressure or both into controller 10. Although a personal computer is typically used, the interface 214 comprises any appropriate graphical or alpha numeric display, and can be mounted directly to the controller. As in previous embodiments, the target position or pressure profile is selected for each gate associated therewith by pre-determining the profile for each injection cycle (typically including at least parameters for injection position or pressure, injection time, pack position or pressure and pack time), inputting the target profile into controller 10, and running the process. In the case of a multicavity application in which different parts are being produced in independent cavities associated with each nozzle (a "family tool" mold), it is preferable to create each target profile separately, since differently shaped and sized cavities can have different profiles which produce the parts. For example, in a system having a manifold with four gates for injecting into four separate cavities, to create a profile for a particular gate, three of the four gates are shut off while the target profile is created for the fourth. Three of the four nozzles are shut off by keeping the valve pins in the position shown in FIG. 4 or 6 in which no melt flow is permitted into the cavity.

To create a target profile for a particular gate, the injection molding machine is set at maximum injection pressure and screw speed, and parameters relating to the injection pressure or injection pin/ram/valve position, injection time, pack pressure or pack pin/ram/valve position, and pack time are set on the controller 10 at values that the molder estimates will generate the best parts based on part size, shape, material being used, experience, etc. Multiple injection cycles are carried out on a trial and error basis for each gate, with alterations being made to the above parameters depending on the condition of the part being produced during the trial cycle. When the most satisfactory parts are produced, the profile that produced the most satisfactory parts is determined for each gate and cavity associated therewith. Preferably, the target profiles determined for each gate are stored in a digital memory, e.g. on a file stored in interface 214 and used by controller 10 for production. The process can then be run under the control of the controller 10 for all gates using the particularized profiles. The foregoing process of profile creation can be used with any number of gates. Although it is preferable to profile one gate and cavity at a time in a "family tool" mold application (while the other gates or their associated valves are closed), the target profiles can also be created by running all nozzles simultaneously, and similarly adjusting each gate profile according to the quality of the parts produced. This would be preferable in an application where all the gates are injecting into like cavities, since the profiles should be similar, if not the same, for each gate and cavity associated therewith.

In single cavity applications (where multiple nozzles from a manifold are injecting into a single cavity), the target profiles would also be created by running the nozzles at the same time and adjusting the profiles for each nozzle according to the quality of the part being produced. The system can also be simplified without using interface 214, in which each target profile can be stored on a computer readable medium in controller 10, or the parameters can be set manually on the controller.

The present invention can use any of the properties or states that a selected sensor is capable of sensing as a basis for creating a profile of target values for input as variables to an algorithm to be executed by controller 10. In particular, a target profile of the position of a valve pin, rotary valve or ram/cylinder may be used such components being directly responsible for controlling material flow. The values of other injection machine, hotrunner or mold components or materials can also be used to create a target profile that correlates to material flow. For example, the position or condition of mechanical components or drive materials associated with the direct flow control components can be used where the condition or position of such associated components/materials accurately corresponds to the position of the direct flow control components. For example, the pressure or temperature of the hydraulic or pneumatic fluid that drive a servocontroller for an actuator can be used to create a target profile. Similarly, the degree or state of electrical power/energy consumption or output of an electrically powered motor that drives the movement of a pin, valve or ram/cylinder can be used to create a target profile indicative of position of the direct flow controlling component.

In the FIGS. 1, 4-6 embodiments, position sensors 100 and condition sensors 217 are shown as preferred for creating position and/or material condition target profiles as well as for recording and sending position and/or material condition data to the controller 10 to be used in an algorithm that is designed to use such data as a basis for instructing movement of the servomechanisms that control movement of the direct flow control components such as valve pin 200.

For purposes of ease of description, FIGS. 9a-d show sample target profiles based solely on pressure recorded by sensors 217. The X axis data of the profiles/graphs shown in FIG. 9a could alternatively be position data that is generated by position sensors 100.

As shown in FIGS. 9a-d, the graphs are material pressure versus injection cycle time (235, 237, 239, 241) of the pressure sensed by four pressure transducers associated with four nozzles mounted in manifold block 231, FIG. 1 (only two nozzles shown). The graphs of FIGS. 9a-d are generated on the user interface 214 so that a user can observe the tracking of the actual pressure versus the target pressure during the injection cycle in real time, or after the cycle is complete. The four different graphs of FIG. 9a-d show four independent target pressure profiles ("desired") emulated by the four individual nozzles. Different target profiles are desirable to uniformly fill different sized individual cavities associated with each nozzle, or to uniformly fill different sized sections of a single cavity.

The valve pin 200 associated with graph 235 is opened sequentially at 0.5 seconds after the valves associated with the other three graphs (237, 239 and 241) were opened at 0.00 seconds. Referring back to FIGS. 4-6, just before opening, the valve pins are in the position shown in FIG. 4, while at approximately 6.25 seconds at the end of the injection cycle all four valve pins are in the position shown in FIG. 6. During injection (for example, 0.00 to 1.0 seconds in FIG. 9b) and pack (for example, 1.0 to 6.25 seconds in FIG. 9b) portions of the graphs, each valve pin is instructed to move to a plurality of positions by controller 10 to alter the pressure sensed by the pressure transducer 217 associated therewith to track the target pressures of FIGS. 9a-d.

Figure 10:
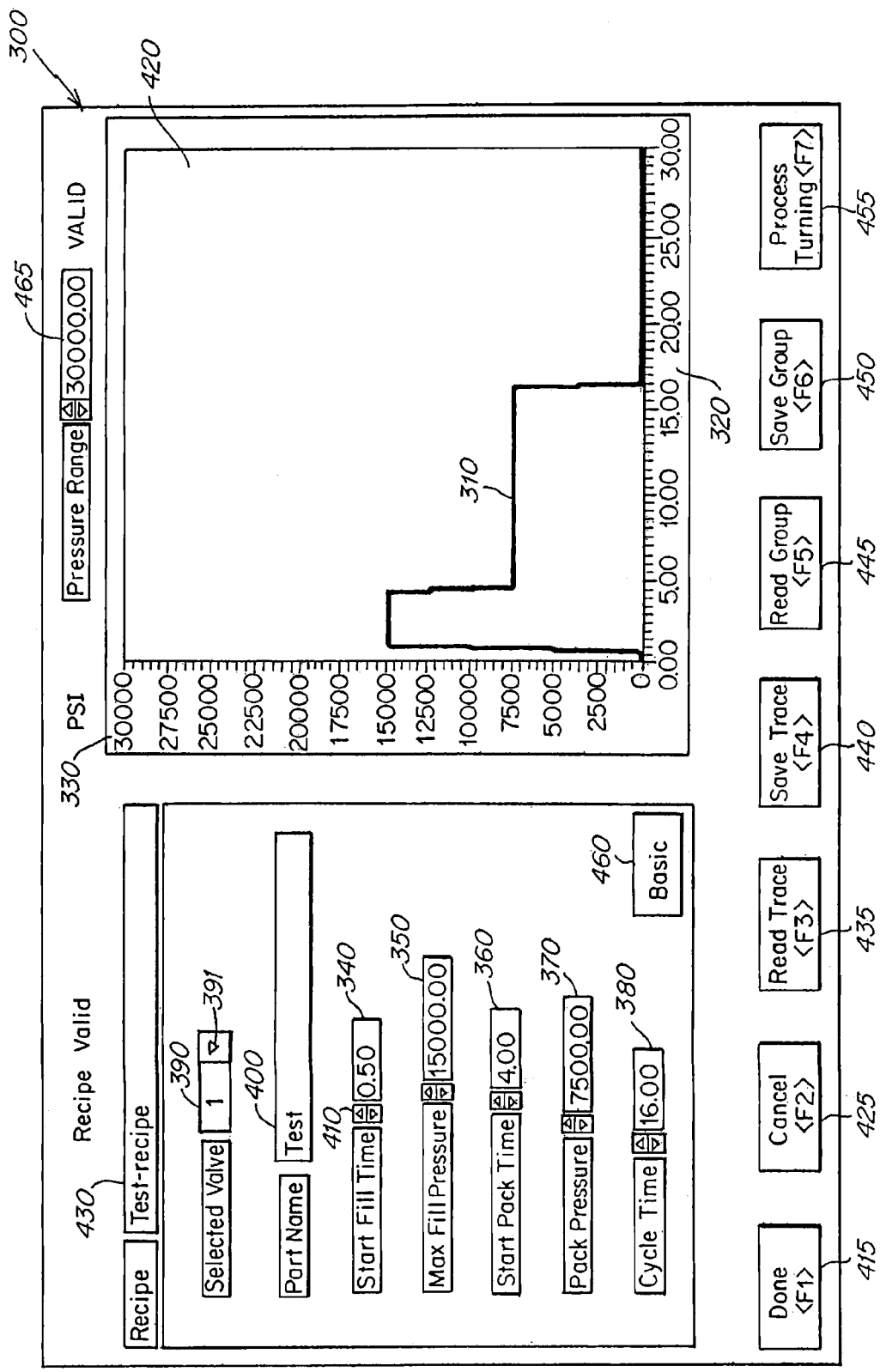
FIGS. 10, 11 are screen icons displayed on interface 114 of FIGS. 5-7 which are used to display, create, edit, and store target profiles.

Through the user interface 214, target profiles can be designed, and changes can be made to any of the target profiles using standard windows-based editing techniques. The profiles are then used by controller 10 to control the position of the valve pins 200. For example, FIG. 10 shows an example of a profile creation and editing screen icon 300 generated on interface 214. Screen icon 300 is generated by a windows-based application performed on interface 214. Alternatively, this icon could be generated on an interface associated with controller 10. Screen icon 300 provides a user with the ability to create a new target profile or edit an existing target profile for any given nozzle and cavity associated therewith. Screen icon 300 and the profile creation text techniques described herein are described with reference to FIGS. 4-6, although they are applicable to all embodiments described herein.

In the pressure based profiles of FIGS. 9a-d a profile 310 includes (x, y) data pairs, corresponding to time values 320 and pressure values 330 which represent the desired pressure sensed by the pressure transducer for the particular nozzle being profiled. The screen icon shown in FIG. 10 is shown in a "basic" mode in which a limited group of parameters are entered to generate a profile. For example, in the foregoing embodiment, the "basic" mode permits a user to input start time displayed at 340, maximum fill pressure displayed at 350 (also known as injection pressure), the start of pack time displayed at 360, the pack pressure displayed at 370, and the total cycle time displayed at 380. The screen also allows the user to select the particular valve pin they are controlling displayed at 390, and name the part being molded displayed at 400. Each of these parameters can be adjusted independently using standard windows-based editing techniques such as using a cursor to actuate up/down arrows 410, or by simply typing in values on a keyboard. As these parameters are entered and modified, the profile will be displayed on a graph 420 according to the parameters selected at that time.

By clicking on a pull-down menu arrow 391, the user can select different nozzle valves in order to create, view or edit a profile for the selected nozzle valve and cavity associated therewith. Also, a part name 400 can be entered and displayed for each selected nozzle valve. The newly edited profile can be saved in computer memory individually, or saved as a group of profiles for a group of nozzles that inject into a particular single or multi-cavity mold. The term "recipe" is used to describe a group of profiles for a particular mold and the name of the particular recipe is displayed at 430 on the screen icon.

To create a new profile or edit an existing profile, first the user selects a particular nozzle valve of the group of valves for the particular recipe group being profiled. The valve selection is displayed at 390. The user inputs an alpha/numeric name to be associated with the profile being created, for family tool molds this may be called a part name displayed at 400. The user then inputs a time displayed at 340 to specify when injection starts. A delay can be with particular valve pins to sequence the opening of the valve pins and the injection of melt material into different gates of a mold. The user then inputs the fill (injection) pressure displayed at 350. In the basic mode, the ramp from zero pressure to max fill pressure is a fixed time, for example, 0.3 seconds. The user next inputs the start pack time to indicate when the pack phase of the injection cycle starts. The ramp from the filling phase to the packing phase is also fixed time in the basic mode, for example, 0.3 seconds.

The final parameter is the cycle time which is displayed at 380 in which the user specifies when the pack phase (and the injection cycle) ends. The ramp from the pack phase to zero pressure will be instantaneous when a valve pin is used to close the gate, as in the embodiment of FIG. 4 due to the residual pressure in the cavity which will decay to zero pressure once the part solidifies in the mold cavity. User input buttons 415 through 455 are used to save and load target profiles. Button 415 permits the user to close the screen. When this button is clicked, the current group of profiles will take effect for the recipe being profiled. Cancel button 425 is used to ignore current profile changes and revert back to the original profiles and close the screen. Read Trace button 435 is used to load an existing and saved target profile from memory. The profiles can be stored in memory contained in the interface 215 or the controller 10. Save trace button 440 is used to save the current profile. Read group button 445 is used to load an existing recipe group. Save group button 450 is used to save the current group of target profiles for a group of nozzle valve pins. The process tuning button 455 allows the user to change the PID settings (for example, the gains) for a particular nozzle valve in a control zone. Also displayed is a pressure range 465 for the injection molding application.

Figure 11:
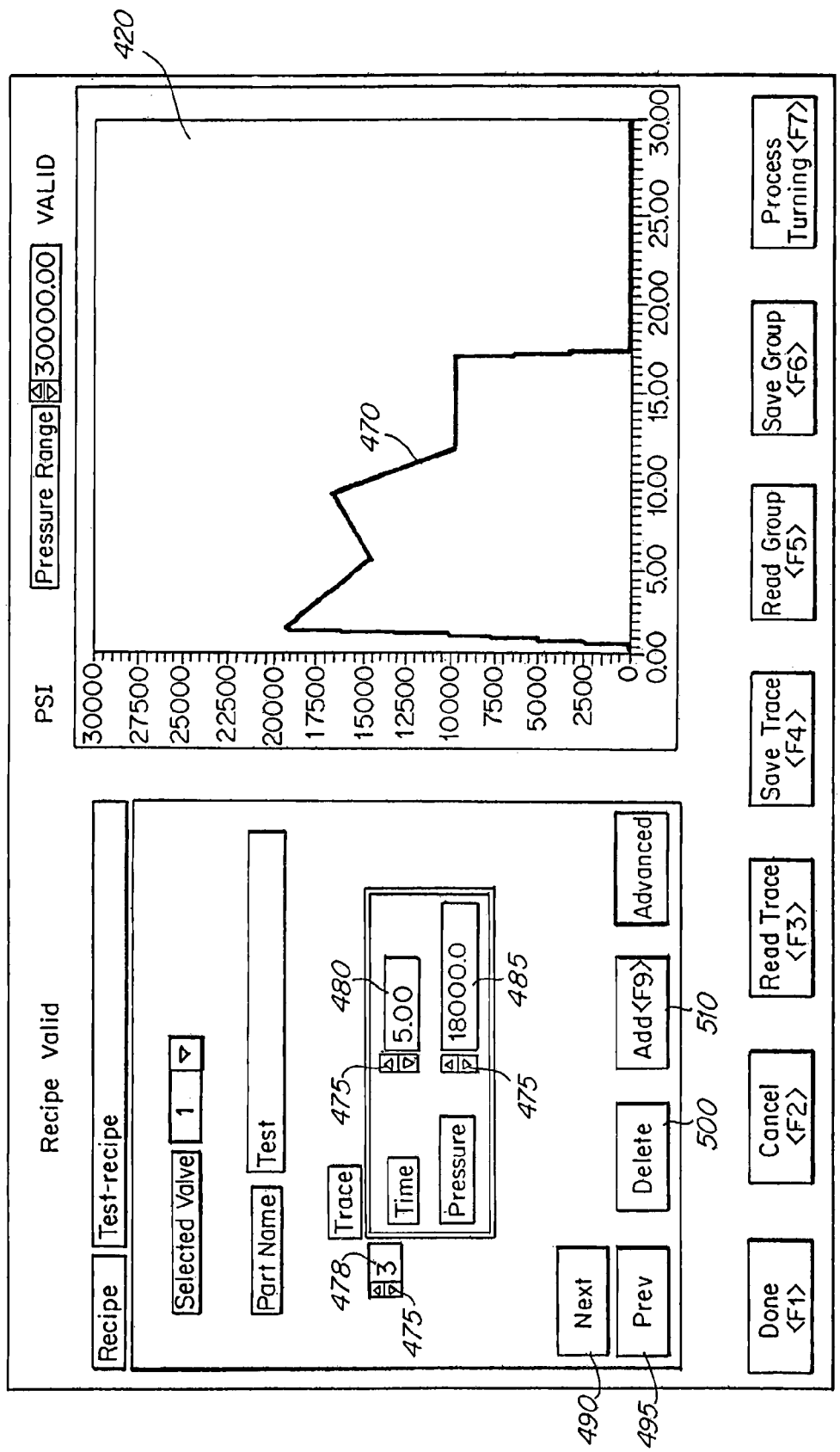

Button 460 permits the user to toggle to an "advanced" mode profile creation and editing screen. The advanced profile creation and editing screen is shown in FIG. 11. The advanced mode allows a greater number of profile points to be inserted, edited, or deleted than the basic mode. As in the basic mode, as the profile is changed, the resulting profile is displayed. The advanced mode offers greater profitability because the user can select values for individual time and pressure data pairs. As shown in the graph 420, the profile 470 displayed is not limited to a single pressure for fill and pack, respectively, as in the basic mode. In the advanced mode, individual (x, y) data pairs (time and pressure) can be selected anywhere during the injection cycle. To create and edit a profile using advanced mode, the user can select a plurality of times during the injection cycle (for example 16 different times), and select a pressure value for each selected time. Using standard windows-based editing techniques (arrows 475) the user assigns consecutive points along the profile (displayed at 478), particular time values displayed at 480 and particular pressure values displayed at 485. The next button 490 is used to select the next point on the profile for editing. Prev button 495 is used to select the previous point on the profile for editing. Delete button 500 is used for deleting the currently selected point. When the delete button is used the two adjacent points will be redrawn showing one straight line segment. The add button 510 is used to add a new point after the currently selected point in which time and pressure values are entered for the new point. When the add button is used the two adjacent points will be redrawn showing two segments connecting to the new point.

FIG. 8 shows an example of an algorithm executable by controller 10 using both pressure and pin position as variables for control of movement of an extended pin 200 such as shown in FIGS. 4-6. Such an algorithm is useful particularly where material condition measurement by a sensor such as pressure sensor 217 is not alone sufficient to precisely base control on. For example, as shown in FIG. 5, the pin is in a position where material flow is occurring during the injection and/or pack stages of the injection cycle. As described above, when the target profile calls for an increase in pressure or a change in position to increase material flow, the controller 10 will cause the valve pin 200 to move forward to increase gap 207, which increases material flow and the pressure sensed by pressure transducer 217. However, if the injection molding machine is not providing adequate pressure to meet the higher pressure called for by the target pressure, moving the pin 200 forward beyond the position shown in FIG. 5 will not increase the pressure sensed by transducer 217 enough to reach the target pressure and the controller 10 will continue to instruct the servomechanism 212 to move the pin forward. This could lead to a loss of control since moving the pin further forward will tend to cause the distal end or head 227 of the valve pin 200 to prematurely move to the position shown in FIG. 6 and close the gate 211.

The controller 10 may also not correctly instruct the servomechanism 212 due to a time delay in the increase of pressure at the position of sensor 217 and thus a delay in the accuracy of data being recorded by pressure sensor 217 relative to the assumed instantaneous pressure increase on which the target profile of time versus pressure is based. Such discrepancy in sensor measurement can occur as a result of a gradient in material pressure between bore 208, 213 and pressure in the machine barrel or channel 13, the delay in pressure increase resulting in the controller 10 instructing the pin 200 to move further downstream than desired, possibly to a point where the distal end 227 of the pin 200 begins to restrict flow at the gate 211 or stops flow altogether.

Accordingly, to maintain precise control of the pin 200 according to the predetermined pressure versus time profile, the controller is programmed with an algorithm according to the flow chart of FIG. 8 where a predetermined limit position is selected, the limit position typically being a position at which maximum flow or pressure occurs. In practice, the extended pin 200 embodiment has a plurality of maximum flow/pressure positions extending over a length of travel somewhere between the closed position shown in FIG. 6 and the position shown in FIG. 5. The limit position is typically selected as being one or more of the maximum flow/pressure positions, however another position can be selected as the limit position, if desired, for particular processing reasons peculiar to the part being produced.

As shown in FIG. 8, the algorithm executed by controller 10 includes instructions that compare the signal being received from position sensor 100 with the limit position to determine first whether the pin is at the limit position at a time prior to the end of the injection and pack phases of the cycle and, if so, the controller 10 then compares the pressure signal from sensor 217 to the profile pressure at the same point in time to determine whether an increase or decrease in pressure is called for by the profile. If the profile calls for a decrease in pressure at the point where the pin is at the limit position, controller 10 reverts to control of the pin 200 according to the pressure profile, i.e. upstream movement to decrease pressure according to the pressure profile. If the profile calls for an increase in pressure when the pin is at the limit position, the controller 10 sends instructions to the servomechanism 212 to either maintain the pin at its limit position or slightly decrease the pressure (i.e. move the pin upstream) until such time as the profile calls for a decrease in pressure along the course of time of the cycle, i.e. along the length of the Y axis of FIGS. 9*a-d*. Preferably, if the position sensor 100 signals that the pin 200 has traveled beyond the limit position, the controller algorithm includes instructions to direct the servomechanism to halt or reverse pin travel slightly.

As described above the position sensor 100 typically comprises a variable resistor or potentiometer that outputs a voltage signal that varies depending on the degree of extension of rod 102. Also as described above, the sensor embodiment 130 of FIG. 4*a* can be used to detect/sense travel of the pin 200 to or beyond the limit position and signal the controller 10. Other sensors such as a linear voltage differential transformer (LVDT) 100 can be coupled to the pin shaft 200 as shown in FIGS. 2, 3, to produce an output signal proportional to the distance that pin 200 or piston 223 travels. Similarly, the inductive position sensor apparatus 112, 120 and its associated components, FIG. 7 can be used to sense, record and signal pin or piston position to the controller 10. A sensor that operates via a variation in capacitance, i.e. a capacitative sensor, can be coupled to the piston 223 or pin 200. Where an electronic or electrically powered actuator is used to move the pin instead of the hydraulic or pneumatic actuators shown in FIGS. 1-7, the output signal to the electric motor or the servo-control to the motor can be used to estimate pin position, or an encoder mechanism can be interconnected to the motor to generate an output signal proportional to pin position.

At the end of the pack portion of the injection cycle, the valve pin 200 is instructed by the algorithm to move all the way forward/downstream to close off the gate as shown in FIG. 6. In the foregoing example, the full stroke of the pin (from the position in FIG. 4 to the position in FIG. 6) is relatively small, e.g. 12 millimeters, and the rate of flow control stroke length is a fraction of the total, e.g. 4 millimeters. The algorithm instructs the pin 200 to keep the gate 211 closed until just prior to the start of the next injection cycle when it is opened and pin 200 is moved to the position shown in FIG. 4. Immediately after the start of the next cycle, the pin 200 is instructed to move to the limit position as shown in FIG. 8. While the gate 211 is closed, as shown in FIG. 6, the injection molding machine begins plastication for the start of the next injection cycle as the part is cooled and ejected from the mold.

Figure 12:
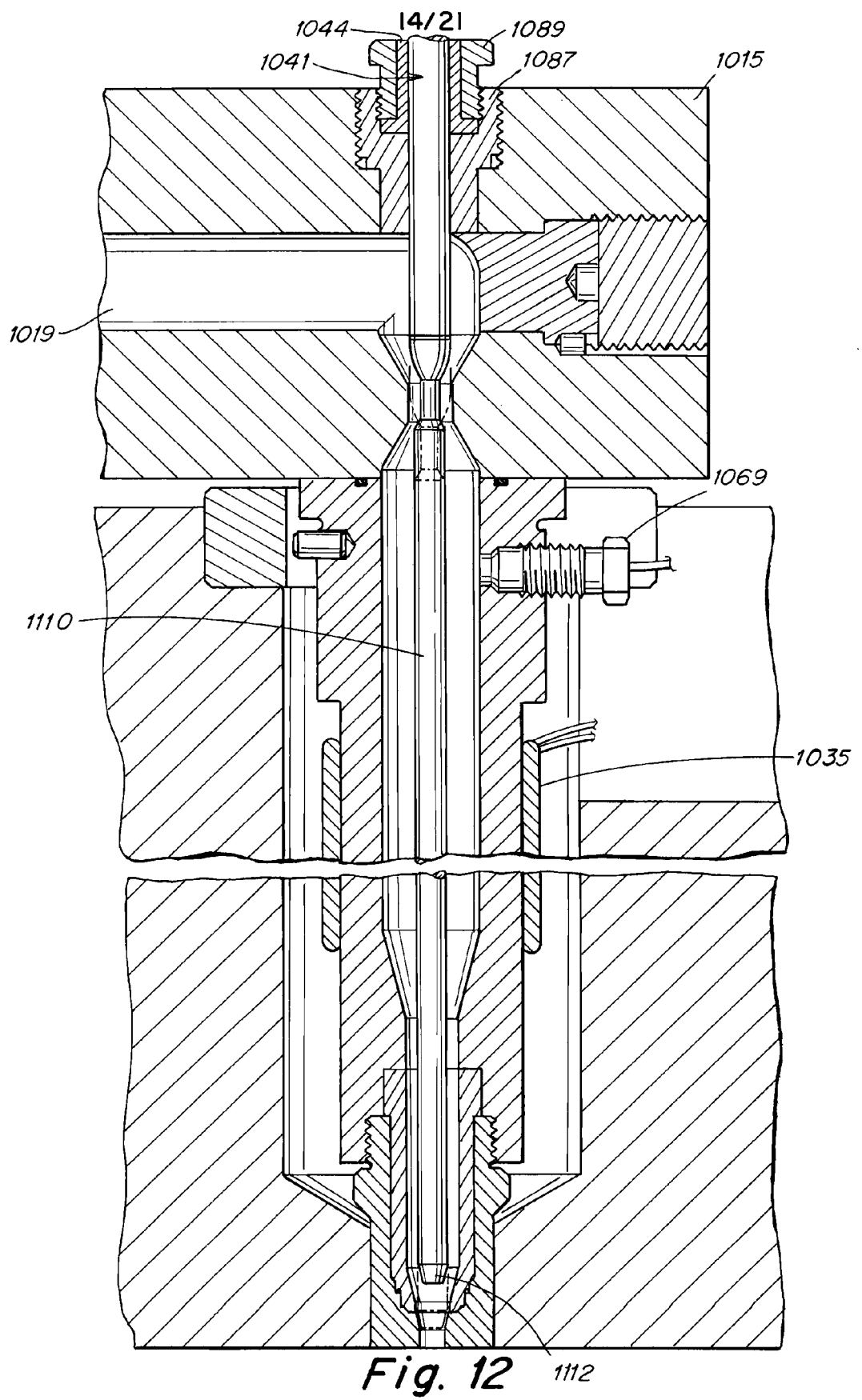
FIG. 12 is a fragmentary cross sectional view of an alternative embodiment of an injection molding system having flow control that includes a valve pin that extends to the gate.
Figure 13:
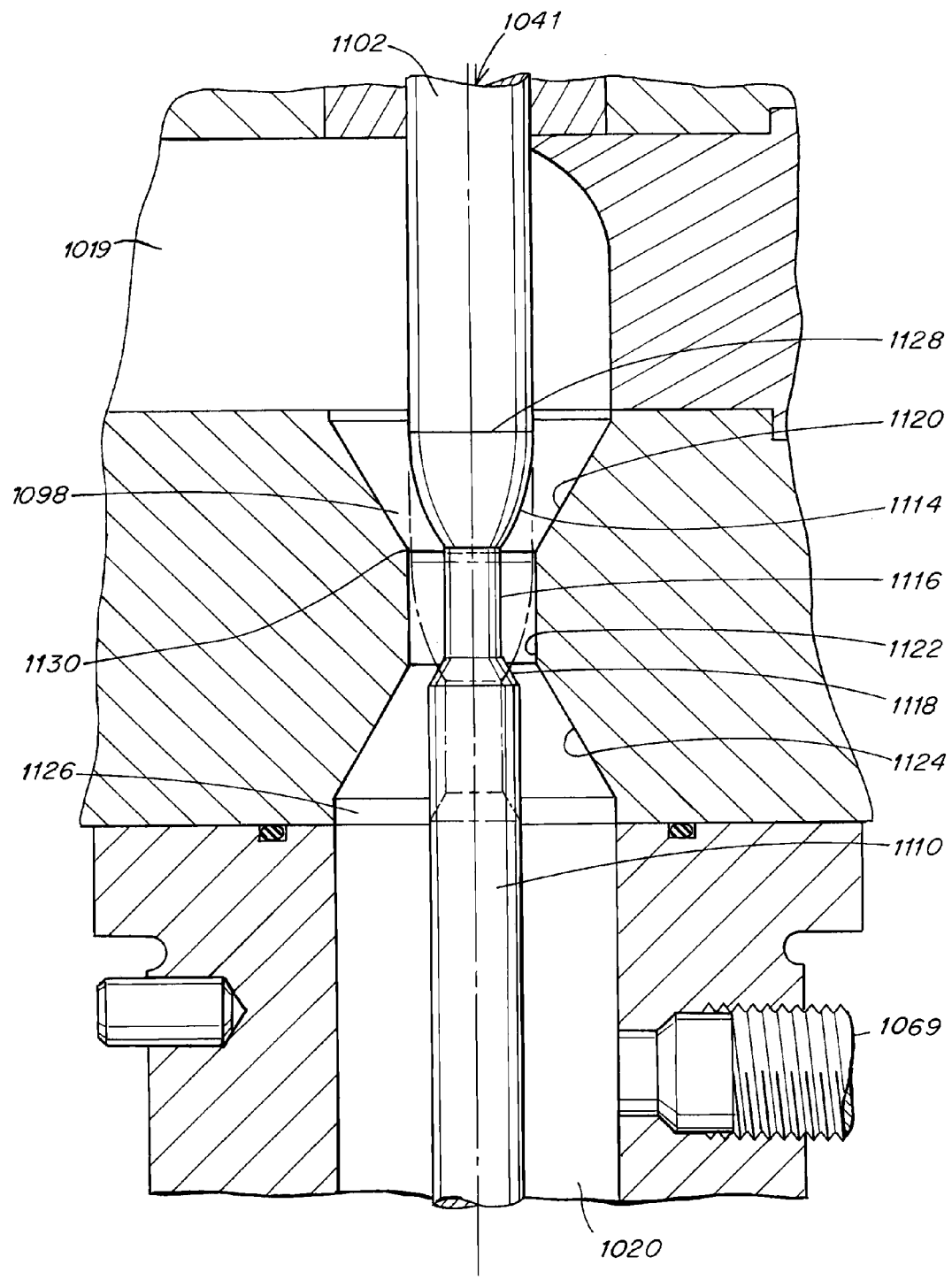
FIG. 13 is an enlarged fragmentary cross-sectional detail of the flow control area.

FIGS. 12 and 13 show an alternative hot-runner system having flow control in which the control of melt flow is still away from the gate as in previous embodiments. Use of the pressure transducer 1069 and PID control system is the same as in previous embodiments. In this embodiment, however, the valve pin 1041 extends past the area of flow control via extension 1110 to the gate. The valve pin is shown in solid lines in the fully open position and in phantom dashed lines in the closed position. In addition to the flow control advantages away from the gate described above, the extended valve pin has the advantage of shutting off flow at the gate with a tapered end 1112 of the valve pin 1041.

Extending the valve pin to close the gate has several advantages. First, it shortens injection cycle time. In previous embodiments thermal gating is used. In thermal gating, plastication does not begin until the part from the previous cycle is ejected from the cavity. This prevents material from exiting the gate when the part is being ejected. When using a valve pin, however, plastication can be performed simultaneously with the opening of the mold when the valve pin is closed, thus shortening cycle time by beginning plastication sooner. Using a valve pin can also result in a smoother gate surface on the part.

The flow control area is shown enlarged in FIG. 13. In solid lines the valve pin is shown in the fully open position in which maximum melt flow is permitted. The valve pin includes a convex surface 1114 that tapers from edge 1128 of the stem 1102 of the valve pin 1041 to a throat area 1116 of reduced diameter. From throat area 1116, the valve pin expands in diameter in section 1118 to the extension 1110 which extends in a uniform diameter to the tapered end of the valve pin.

In the flow control area the manifold includes a first section defined by a surface 1120 that tapers to a section of reduced diameter defined by surface 1122. From the section of reduced diameter the manifold channel then expands in diameter in a section defined by surface 1124 to an outlet of the manifold 1126 that communicates with the bore of the nozzle 1020. FIGS. 12 and 13 show the support ring style nozzle similar to FIGS. 1-3. However, other types of nozzles may be used such as, for example, a threaded nozzle as shown in FIG. 8

As stated above, the valve pin is shown in the fully opened position in solid lines. In FIG. 13, flow control is achieved and melt flow reduced by moving the valve pin 1041 forward toward the gate thereby reducing the width of the control gap 1098. Thus, surface 1114 approaches surface 1120 of the manifold to reduce the width of the control gap and reduce the rate of melt flow through the manifold to the gate.

To prevent melt flow from the manifold bore 1019, and end the injection cycle, the valve pin is moved forward so that edge 1128 of the valve pin, i.e., where the stem 1002 meets the beginning of curved surface 1114, will move past point 1130 which is the beginning of surface 1122 that defines the section of reduced diameter of the manifold bore 1019. When edge 1128 extends past point 1130 of the manifold bore melt flow is prevented since the surface of the valve stem 1002 seals with surface 1122 of the manifold. The valve pin is shown in dashed lines where edge 1128 is forward enough to form a seal with surface 1122. At this position, however, the valve pin is not yet closed at the gate. To close the gate the valve pin moves further forward, with the surface of the stem 1002 moving further along, and continuing to seal with, surface 1122 of the manifold until the end 1112 of the valve pin closes with the gate.

In this way, the valve pin does not need to be machined to close the gate and the flow bore 1009 of the manifold simultaneously, since stem 1102 forms a seal with surface 122 before the gate is closed. Further, because the valve pin is closed after the seal is formed in the manifold, the valve pin closure will not create any unwanted pressure spikes. Likewise, when the valve pin is opened at the gate, the end 1112 of the valve pin will not interfere with melt flow, since once the valve pin is retracted enough to permit melt flow through gap 1098, the valve pin end 1112 is a predetermined distance from the gate. The valve pin can, for example, travel 6 mm. from the fully open position to where a seal is first created between stem 1102 and surface 1122, and another 6 mm. to close the gate. Thus, the valve pin would have 12 mm. of travel, 6 mm. for flow control, and 6 mm. with the flow prevented to close the gate. Of course, the invention is not limited to this range of travel for the valve pin, and other dimensions can be used.

FIGS. 14-18 show an alternative embodiment in which a load cell 1140 is used to sense the melt pressure acting on the face 1142 of valve pin 1041. Where possible, reference characters are used that refer to elements common to FIG. 1. As in previous embodiments, an actuator 1049 is used to translate the valve pin 1041 toward and away from the gate. The actuator 1049 includes a housing 1144 and a piston 1146 slidably mounted within the housing. The actuator is fed by pneumatic or hydraulic lines 1148 and 1150. Other actuators, for example, electrical actuators may also be used.

The valve pin 1041 is mounted to the piston 1146 so that valve pin translates through the injection nozzle 1023 with movement of the piston. The valve pin is mounted to the piston via a pin 1152. The pin 1152 is slotted so that a clearance 1154 exists in which the valve pin can translate with respect to the pin 1152 and piston 1146. The valve pin bears against a button 1156 on the load cell 1140. The load cell 1140 is mounted via screws 1158 to the piston. Thus, as shown in FIG. 26, a force $F_2$ acting on the valve pin will cause the load button 1156 to depress. Excitation voltages or other types of signals which indicate the proportionate force on the load button 1156 are carried through cable 1160 and fed to a controller 1151.

In operation, as seen in FIG. 14, the melt material is injected from an injection molding machine nozzle 1011 into an extended inlet 1013 mounted to a manifold 1015 through respective injection molding nozzles 1021 and 1023 and into mold cavities 1162 and 1164. In the embodiment shown, a multi-cavity mold is shown in which nozzles 1021 and 1023 inject melt material to form different size molded parts in cavities 1162 and 1164, respectively. As stated above, a mold cavity with multiple gates can be used, or multiple mold cavities with cavities having the same size can be used.

Figure 16:
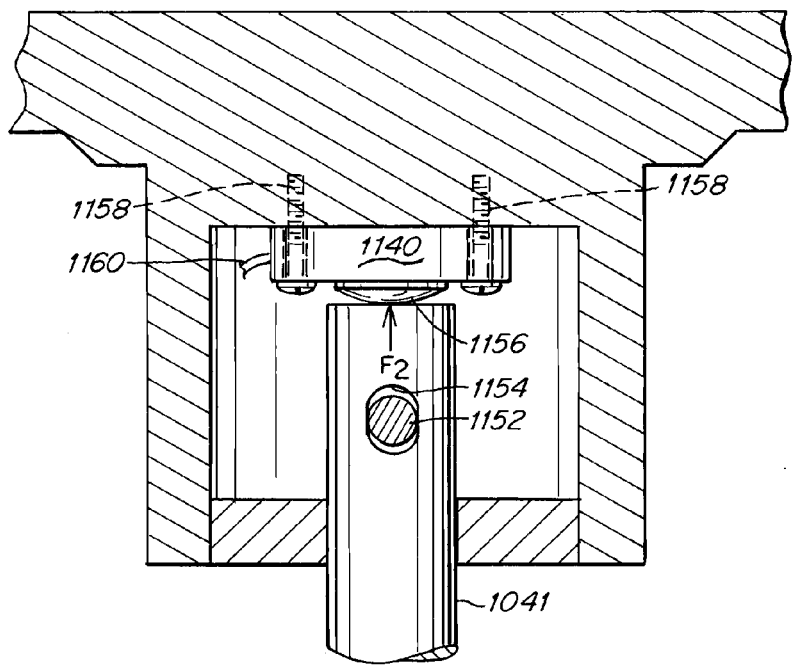
FIG. 16 is an enlarged view of the load cell and valve pin of FIG. 14.

When the valve pin 1041 is retracted to permit melt material to be injected into the cavity 1162, the melt pressure will act on the face of the valve pin 1142 with the resulting force being transmitted through the shaft of the valve pin to the load sensor 1140 (see FIGS. 16-17). Thus, the load ($F_2$) sensed by load cell 1140 is directly related to the melt flow rate into the melt cavity.

Sheer stresses caused by the melt streaming downward over the valve pin will tend to reduce the pressure sensed by the load cell but such stresses are typically less than the nominal load due to the melt pressure. Thus, the resultant force $F_2$ will tend to compress the valve pin toward the load cell, with the possible exception of the initial opening of the valve, and the load cell provides an accurate indicator of the melt pressure at the gate. If the application results in sheer stresses exceeding $F_2$, the load cell can be pre-loaded to compensate for such stresses.

Similar to previous embodiments described above, the signal transmitted through cable 1160 is compared by controller 1151 with a target value of a target profile and the controller adjusts the position of the valve pin accordingly to increase or decrease flow rate. In this embodiment, the target profile is also a time versus pressure profile, but the pressure is the a result of the force of the pin on the load cell, as opposed to previous embodiments in which a pressure transducer directly senses the force of the flow of the melt material. The profile is created in similar fashion to the embodiments described above: running the process and adjusting the profile until acceptable parts are produced.

The valve pin controls the flow rate through the gate using a tapered edge 1155 to form a control gap 1153 close to the gate. It should be noted, however, that any of the other valve pin designs described herein can be used with the load cell 1140. Accordingly, when the pressure sensed by the load cell is less than the target pressure on the target profile, the controller 1151 signals the actuator to retract the valve pin to increase the size of the control gap 1153 and, consequently, the flow rate. If the pressure sensed by the load cell 1140 is greater than the target pressure, the controller 1151 signals the actuator to displace the valve pin toward the gate to decrease the size of the control gap 1153 and consequently, the flow rate.

Figures 17A, 17B:
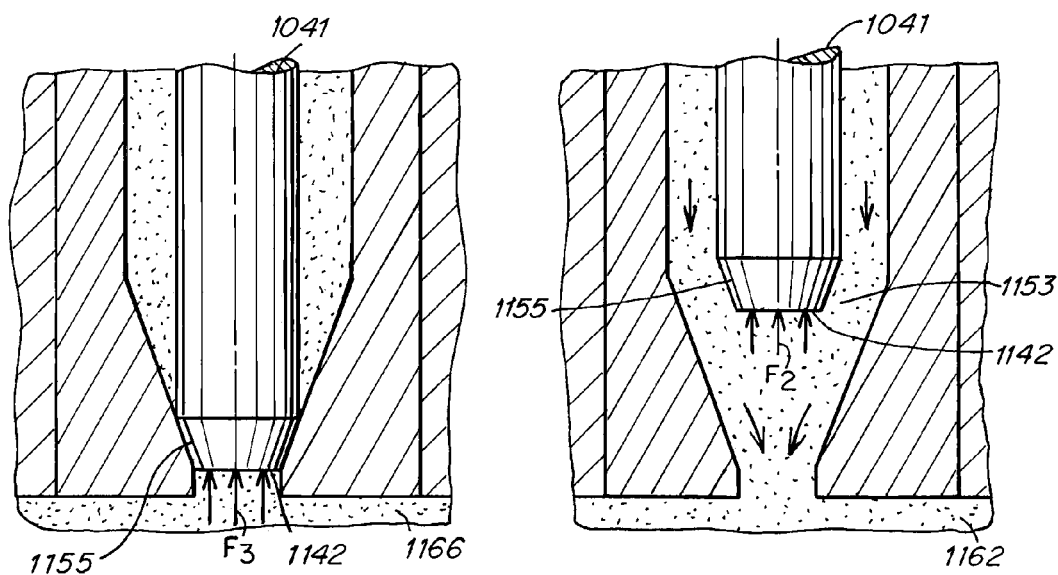
FIGS. 17A and 17B show an enlarged view of the tip of the valve pin closing the gate and controlling the flow rate, respectively.

The use of the load cell has an additional application shown in FIG. 17A. In a single cavity multiple gate system it is often desirable to open gates in a cascading fashion as soon as the flow front of the melt material reaches the gate. When melt material 1166 has flowed into the gate area of the valve pin, a force $F_2$ from the melt in the cavity is exerted on the face 1142 of the valve pin.

In this way, gates can be sequentially opened in cascading fashion by sensing the force of the melt pressure on the face of the valve pin when the valve pin is closed. Given typical gate diameters of 0.2 inches and melt pressures of 10,000 psi, the resulting force of 300 pounds is readily measured by available load sensors, since the force of the cell equals the area of the gate times the pressure at the gate. Thus, this melt detection can then be used to signal the opening of the gate as in the sequential valve gate. This assures that the gate does not open prematurely.

Figure 18A:
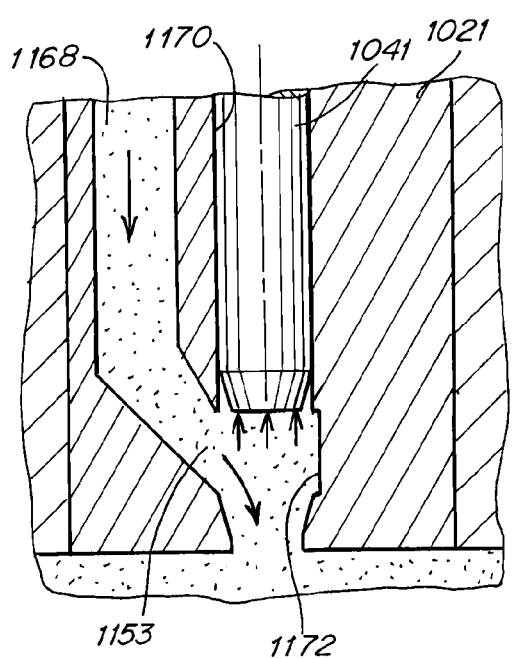
FIGS. 18A and 18B shown an alternative structure of an injection molding nozzle for use in the system shown in FIG. 14.
Figure 18B:
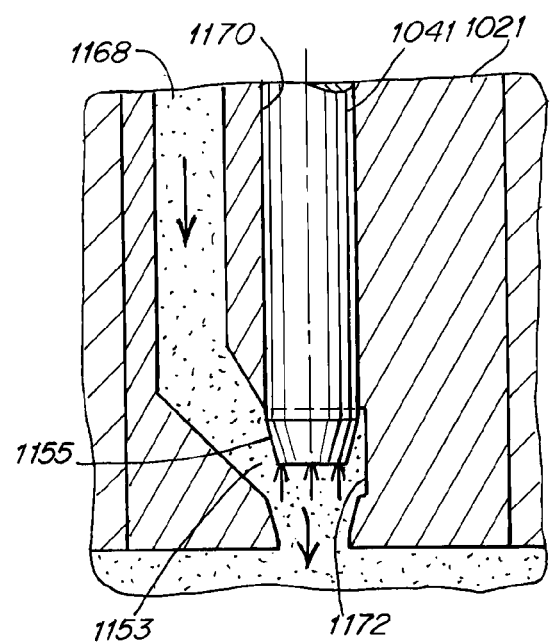

FIGS. 18A and 18B show an alternative embodiment in which the sheer stress on the valve pin is reduced. The nozzle 1021 is designed to include a channel for melt flow 1168 and a bore 1170 through which the valve pin reciprocates. As such, the flow does not cause any axial sheer stress on the valve pin and thus reduces errors in pressure sensing. An indent 1172 is provided in the nozzle 1021 so that side load on the valve pin is reduced, i.e., to equalize pressure on both sides of the valve pin. An additional benefit to the configuration shown in FIGS. 18A and 18B is that since the flow of material is away from the valve pin, the valve pin does not "split" the flow of material, which can tend to cause part lines or a flow streak on the molded part.

Figure 19:
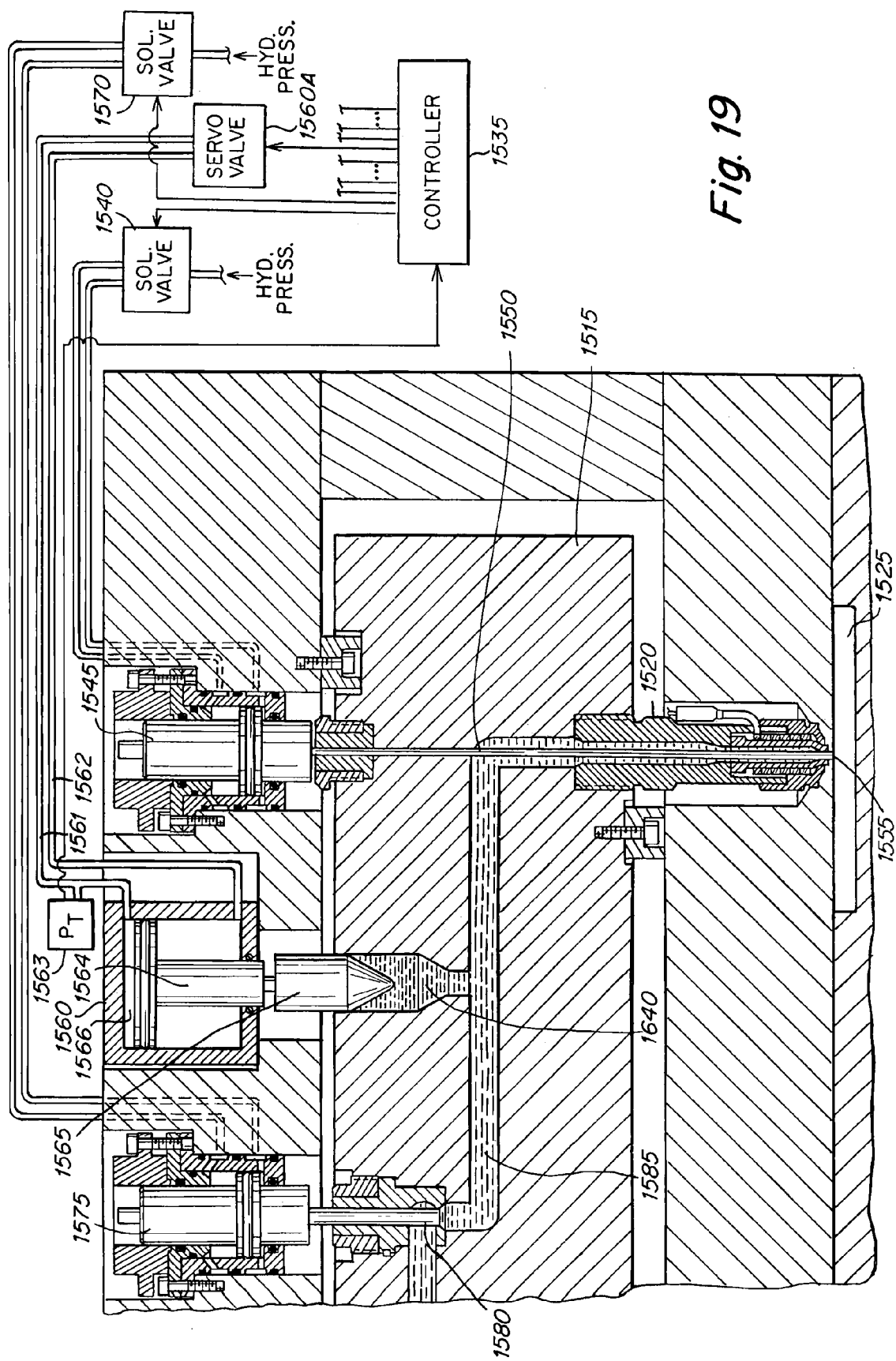
FIG. 19 is a cross-sectional partially schematic view of an alternative embodiment of an injection molding system in which a pressure transducer is used to sense the hydraulic pressure supplied to the actuator.

FIG. 19 shows another alternative embodiment of the present invention in which a ram 1565 is used to force material from well 1640 into cavity 1525 at a controlled rate. The rate is controlled by signals sent from controller 1535 to servo valve 1560A, which in turn controls the velocity at which actuator 1560 moves ram 1565 forward.

In FIG. 19, actuator 1560 is shown in more detail including piston 1564, actuator chamber 1566, and hydraulic lines 1561 and 1562 controlled by servo valve 1560A. Energizing hydraulic line 1561 and filling chamber 1566 causes piston 1564 and ram 1565 to move forward and displace material from well 1640 through channel 1585 and nozzle 1520, and into cavity 1525.

Accordingly, as in previous embodiments, a target profile is created that has been demonstrated to generate acceptable molded parts. In the embodiment of FIG. 19, however, the target profile represents target values of the hydraulic pressure sensed by pressure transducer 1563, as opposed to directly sensing the material pressure. In operation, the controller compares the pressure signal sensed from pressure transducer 1563 to the target pressure profile for gate 1555. If the pressure sensed is too low, the controller will increase the hydraulic pressure in line 1561 (which increases the velocity of the ram which increases flow rate of the material), if the pressure is too high the controller will decrease the hydraulic pressure (which decreases the velocity of the ram which decreases the rate of material flow).

The target pressure profile of the hydraulic fluid will appear similar to a conventional material profile, since the pressure of the hydraulic fluid will rise rapidly during the injection portion of the cycle, level off during the pack portion of the cycle, and go to zero pressure as cycle ends the valve pin 1550 closes.

Although only one injection nozzle 1520 and cavity 1525 is shown, there is a like arrangement associated with each injection nozzle of actuators 1575, 1565, 1545, as well as solenoid valves 1540 and 1570 and servo valve 1560, to independently control the melt flowing from each gate, according to the target profile created for that gate. Also, although a single cavity 1525 is shown, each nozzle may inject to multiple cavities or a single cavity mold. Only a single controller 1535, however, is needed to control all the nozzles associated with manifold 1515.

Using the foregoing arrangement of FIG. 19, as in previous embodiments, the material flow from each nozzle of the manifold can be controlled independently.

Figure 20:
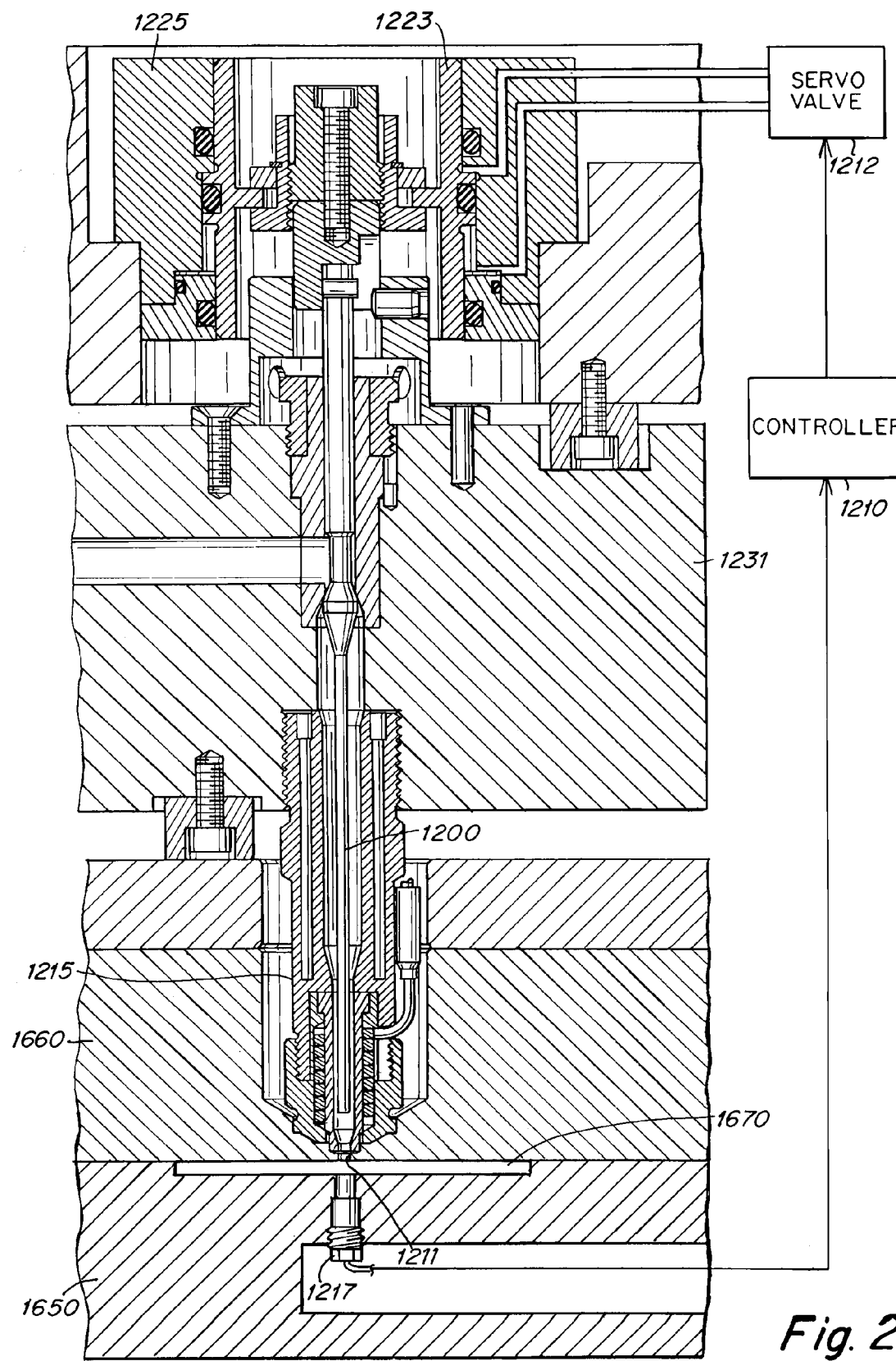
FIG. 20 shows a fragmentary cross-sectional view of an alternative embodiment of an injection molding system having flow control similar to FIG. 14 in which the pressure transducer is mounted in the mold cavity.

FIG. 20 shows another alternative embodiment of the present invention. The embodiment of FIG. 20 is substantially the same as the embodiment shown in FIG. 13 with the exception that pressure transducer 1217 has been moved from manifold 1231 to inside the mold half 1650 which, together with mold half 1660, forms mold cavity 1670 in which the molded part is formed. Accordingly, in this embodiment, the target profile represents target values of the pressure sensed by pressure transducer 1217 inside the cavity opposite the gate 1211.

The operation of the embodiment of FIG. 20 is the same as that described in the embodiment shown in FIG. 5 in terms of target profile creation and use of valve pin 1200 to control the material flow (interface 1214 is not shown but can be used). However, placing the pressure transducer in the cavity offers several advantages, for example, in the cavity the pressure transducer 1217 is not exposed to the high temperatures generated by the manifold, as in FIG. 5. Also, the presence of the pressure transducer in the manifold may slightly disrupt material flow in the manifold. Another consideration in choosing whether to mount the transducer in the mold or in the manifold is whether the mold geometry permits the transducer to be mounted in the mold.

Figure 21:
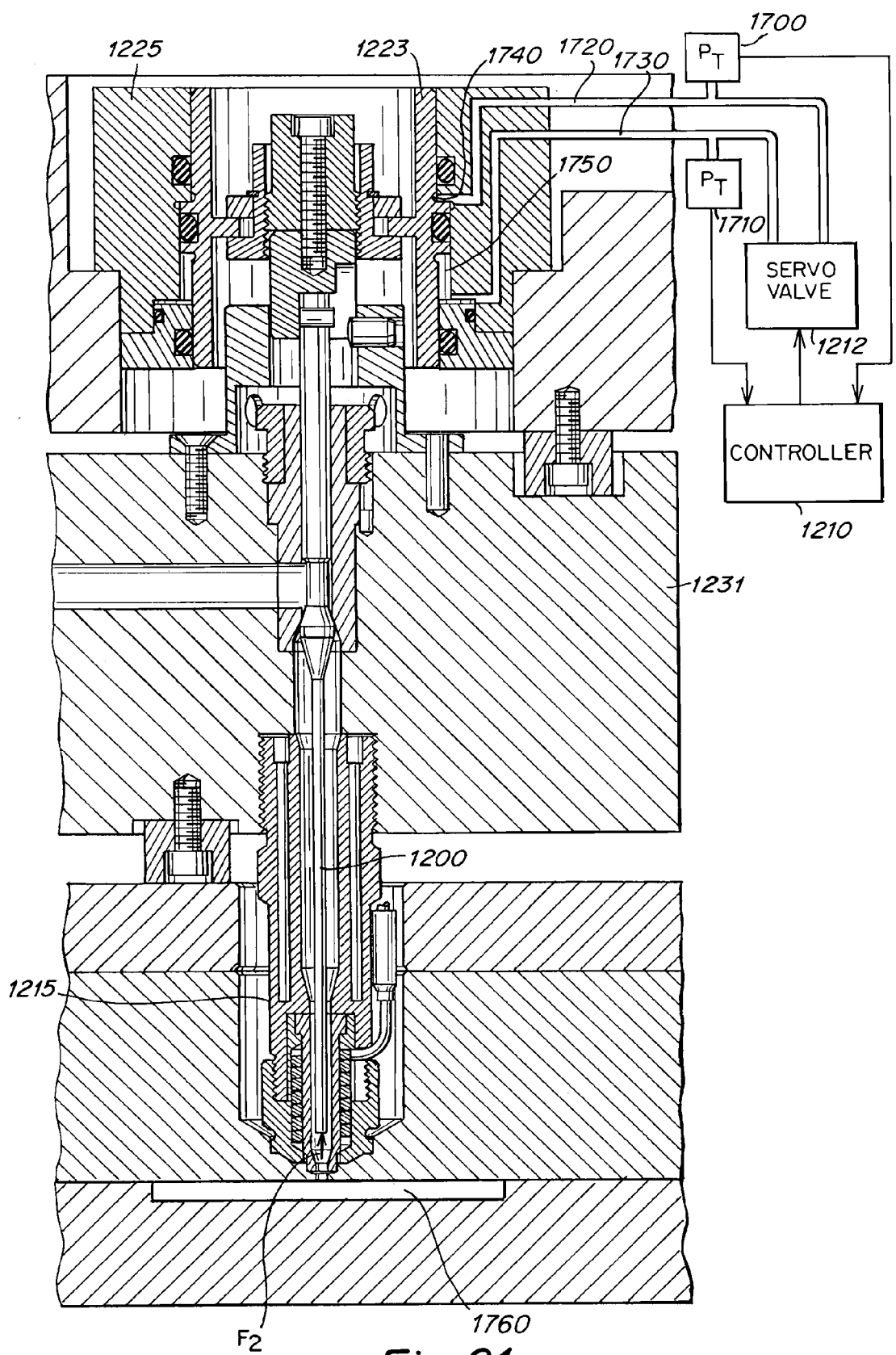
FIG. 21 is a fragmentary cross-sectional view of an alternative embodiment of an injection molding system having flow control in which flow control is effected by measuring the differential pressure of the actuator chambers.

FIG. 21 is another alternative embodiment of the present invention that is similar to FIG. 5. Target profile creation as well as the flow control operation by valve pin 2000 is substantially the same as described above. FIG. 21, however, does not include a pressure transducer 217 as shown in FIG. 5 to directly sense the flow of melt material into the cavity. Rather, similar to the embodiment shown in FIG. 19, the arrangement shown in FIG. 21 performs flow control by sensing the material pressure $F_2$ exerted by the melt material on the valve pin.

In FIG. 14 measuring the load on the valve pin was performed using a load cell 1140, however, in FIG. 21, it is performed by pressure transducers 1700 and 1710 mounted along hydraulic lines 1720 and 1730 which lead to actuator chambers 1740 and 1750, respectively. Energizing lines 1720 and 1730 and filling actuator chambers 1740 and 1750, enables axial movement of piston 1223, thereby moving valve pin 1200 and affecting the flow rate of the material into the cavity 1760 as described above.

Pressure transducers 1700 and 1710 sense a differential pressure which is directly related to the force exerted on valve pin 1200, which is directly related to the flow rate of the material. For example, when the material flow causes a force $F_2$ to act on valve pin 1200, the force relates up the valve pin to the piston, which in turn tends to increase the pressure in chamber 1740 and line 1720 and decrease the pressure in chamber 1750 and line 1730, directly causing a change in the difference in the pressures sensed by the transducers 1700 and 1710. Accordingly, the differential pressure is directly related to the flow rate of the material into the cavity.

Once an acceptable target profile of differential pressure is developed using techniques described above, the controller will cause the servo valve 1212 to track this target profile by altering the position of the valve pin to change the flow rate of the material and track the differential pressure target profile.

For example, if the differential pressure is too high (e.g., the pressure sensed by transducer 1700 is higher than the pressure sensed by transducer 1710 by an amount greater than the target differential pressure) the controller will cause servo valve to retract the valve pin to reduce the flow rate, thereby reducing the force $F_2$ on the valve pin, thereby decreasing the pressure in chamber 1740 and line 1720, thereby decreasing the pressure sensed by transducer 1700, thereby decreasing the difference in pressure sensed by transducers 1700 and 1710. Note, in certain applications the differential pressure may be negative due to the sheer force of the material on the valve pin, this however will not affect the controller's ability to track the target profile.

As in the embodiment shown in FIG. 14, the embodiment shown in FIG. 21 offers the advantage that it is not necessary to mount a pressure transducer in the mold or the manifold. As in all previous embodiments, the embodiment shown in FIG. 21 enables the material flow from each nozzle attached to the manifold to be independently profileable.

Having thus described certain embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereof.

What is claimed is:

1. In a molding machine having a manifold for distributing a melt material flowing under pressure through a passage leading to a gate of a mold cavity wherein the rate of flow of the melt material is determined by positioning of a pin that is controllably movable through the channel to create a gap of controllable size between the pin and the passage, wherein the pin is disposed within the melt material on which the melt material exerts a melt pressure force, an apparatus for controlling positioning of the pin comprising:

an actuator adapted to receive and controllably oppose the force exerted on the actuator by the melt material through the pin and adjust the rate of material flow by positioning of the pin and controlling the size of the gap, a controller controlling the actuator to oppose the melt pressure force received through the pin according to a predetermined profile of pressure corresponding to the melt pressure force that is indicative of a desired rate of material flow through the passage and into the cavity over the course of an injection cycle.

2. In a molding machine having a manifold for distributing a melt material flowing under pressure through a passage leading to a gate of a mold cavity wherein the rate of flow of the melt material is determined by positioning of a pin that is controllably movable through the channel, wherein the pin has a flow control surface that establishes a variable flow rate of the melt material according to positioning of the pin within the passage, wherein the pin is disposed within the melt material on which the melt material exerts a melt pressure force, an apparatus for controlling positioning of the pin comprising:

an actuator adapted to controllably move the pin through the passage and adjust positioning of the flow control surface of the pin within the passage, the actuator having a piston driven by a drive fluid that is adapted to receive the melt pressure force through the pin and to respond to the received force according to a predetermined profile of pressure of the drive fluid over the course of an injection cycle, and, a controller controlling movement of the piston according to the predetermined profile of pressure causing the piston to set the positioning of the flow control surface of the pin within the passage at a series of predetermined positions within the passage over the course of the injection cycle that correspond to the predetermined profile of pressure of the drive fluid over the course of the injection cycle.

3. In an injection molding system having a manifold to direct melt material through a passage to a gate which leads to a mold cavity, the passage having a valve pin movably disposed therein, the valve pin being controllably movable by an actuator and having a flow control surface that receives and exerts a melt pressure force on the actuator, the movement of the valve pin within the passage positioning the flow control surface at varying positions within the passage that vary the flow rate of the melt material through the passage, the method comprising the steps of:

(A) injecting material into the manifold;

(B) predetermining a profile of pressure to be exerted by an actuator that in opposition to the melt pressure force on the actuator received through the valve pin over the course of an injection cycle, the predetermined profile of actuator pressure corresponding to a predetermined rate of flow of melt material over the course of the injection cycle;

(C) controlling the actuator to oppose the force of the material received through the valve pin according to the predetermined profile of actuator pressure over the course of the injection cycle.

4. The method of claim 3 wherein the actuator is adapted to receive the force of the material exerted through the pin via an actuator drive fluid, the pressure of the drive fluid being controlled according to a predetermined profile of drive fluid pressure to oppose the force of the material.

* * * * *